US007769653B2

(12) United States Patent
Rousseau et al.

(10) Patent No.: US 7,769,653 B2
(45) Date of Patent: Aug. 3, 2010

(54) SYSTEMS AND METHODS FOR CONSTRUCTING A VALUE INDEX AND A GROWTH INDEX

(75) Inventors: Valéry Rousseau, Bons en Chablais (FR); Rémy Briand, Vandoeuvres (CH); Giacomo Fachinotti, Gy (CH); Khalid Ghayur, Princeton, NJ (US); Jacques Roulet, Vésenaz (CH)

(73) Assignee: Morgan Stanley Capital International, Inc., New York, NY (US)

( * ) Notice: Subject to any disclaimer, the term of this patent is extended or adjusted under 35 U.S.C. 154(b) by 1436 days.

(21) Appl. No.: 10/833,860

(22) Filed: Apr. 28, 2004

(65) Prior Publication Data

US 2005/0246255 A1 Nov. 3, 2005

(51) Int. Cl.
*G06Q 40/00* (2006.01)
(52) U.S. Cl. .......................................... 705/35
(58) Field of Classification Search ................ 705/35
See application file for complete search history.

(56) References Cited

U.S. PATENT DOCUMENTS

| 7,062,459 | B1 | 6/2006 | Herbst et al. |
|---|---|---|---|
| 7,366,692 | B2 | 4/2008 | Alcaly et al. |
| 2002/0007329 | A1 | 1/2002 | Alcaly et al. |
| 2003/0120568 | A1 | 6/2003 | Chacko et al. |
| 2003/0130917 | A1 | 7/2003 | Crovetto |
| 2003/0149648 | A1 | 8/2003 | Olsen et al. |
| 2003/0172021 | A1 | 9/2003 | Huang |
| 2004/0181477 | A1 | 9/2004 | Sauter et al. |
| 2004/0236661 | A1 | 11/2004 | Benning |
| 2006/0100949 | A1 | 5/2006 | Whaley et al. |
| 2006/0195383 | A1 | 8/2006 | Masuda |
| 2007/0016497 | A1 | 1/2007 | Shalen et al. |
| 2007/0043644 | A1 | 2/2007 | Weiss |
| 2007/0136172 | A1 | 6/2007 | West |
| 2007/0244787 | A1 | 10/2007 | Lowry |
| 2008/0071700 | A1 | 3/2008 | Catalano-Johnson |
| 2008/0082435 | A1 | 4/2008 | O'Brien et al. |
| 2008/0091622 | A1 | 4/2008 | Yass et al. |
| 2008/0120250 | A1 | 5/2008 | Hiatt, Jr. |
| 2008/0177675 | A1 | 7/2008 | Arginteanu |
| 2008/0215503 | A1 | 9/2008 | Saliba |

OTHER PUBLICATIONS

Winsorize, Heckert, A, NIST, available @ http://www.itl.nist.gov/div898/software/dataplot/refman2/auxillar/winsor.htm, last accessed Nov. 23, 2008.*

(Continued)

*Primary Examiner*—James P Trammell
*Assistant Examiner*—Daniel L Greene, Jr.
(74) *Attorney, Agent, or Firm*—K&L Gates LLP

(57) ABSTRACT

A method of constructing a value index and a growth index is disclosed. The method includes, determining a value of each variable in a group of variables for each security in a group of securities, determining a standardized score of each variable for each security, and determining an overall value standardized score and an overall growth standardized score for each security. The method further includes positioning each security in a two-dimensional style space and allocating each security to at least one of the growth index and the value index based on each security's distance from an origin of the two-dimensional style space.

23 Claims, 19 Drawing Sheets

OTHER PUBLICATIONS

MSCI Value and Growth Indices: Methodology & Description, Dec. 1997. Available on Apr. 28, 2004 at http://www.msci.com.

MSCI Press Release, Sep. 25, 2002. "MSCI develops enhanced methodology for its global value and growth indices". Available on Apr. 28, 2004 at http://www.msci.com.

MSCI Methodology Book: MSCI Global Value and Growth Index Series, Apr. 29, 2003. Available on Apr. 28, 2004 at http://www.msci.com.

* cited by examiner

SYSTEMS AND METHODS FOR CONSTRUCTING A VALUE INDEX AND A GROWTH INDEX

BACKGROUND

This application is related, generally and in various embodiments, to financial indices and, more particularly, to systems and methods for constructing and maintaining a value index and a growth index representative of a group of securities.

A financial index is a statistical construct that measures price changes, returns, industry exposures, country exposures, interest rates and/or other financial data in stock markets, fixed income markets, currencies or futures markets. One use of an index is to provide a summary measure whose behavior is representative of the movements of prices or rates of a group of securities, and thus an indication of the behavior of a broad market. Another use of an index is to provide an unmanaged representation of an opportunity set that is representative of investment strategies followed by practitioners. Because indices serve as a barometer for the overall performance of a particular market, they are used as benchmarks against which investment results are measured as well as for implementing various investment strategies such as asset allocation, relative value analysis, and portfolio analysis. Furthermore, indices are often used as a basis for other products and strategies (e.g., derivative products) that provide investors with a convenient way of profiting from overall market movements. Examples of indices are the S&P 500, an equity index that tracks the performance of 500 publicly traded companies, and the J.P. Morgan Government Bond Index, a benchmark used for measuring performance and quantifying risk across international sovereign bond markets.

It is known to break down broad equity indices into various sub-segments that are defined on the basis of the characteristics of the securities that define the indices. Common types of segmentation include size and style. Segmentation of broad equity indices into various size and style sub-indices provides an opportunity for investors to enhance the performance of a total equity portfolio by varying exposure to specific market segments which have different characteristics and thus perform differently, and by allocating mandates to managers specializing in different market segments and investment styles.

Size segmentation involves defining sub-segments in an equity index based on the equity market capitalization of the securities that define the index. Most investors recognize four size segments: large capitalization, mid capitalization, small capitalization and micro capitalization. Style segmentation involves identifying a value segment and a growth segment based on the accounting, fundamental data, and market data of the securities that define the underlying index. While the method of defining size is relatively standard, the method of defining style is not. At a high level, value securities can be defined as securities of companies with lower than average valuation while growth securities can be defined as securities of companies with higher than average future growth prospects.

It is known to form equity style indices from a broad index by selecting a variable, or a set of variables aggregated in one score, according to which securities are ranked. This ranking is then used to split the broad index in halves that form a value index and a growth index. For example, in forming a value index and a growth index for a particular country stock index, the value of the price to book value ratio (P/BV where BV is the book value of equity in the company balance sheet) of each security can be used to rank the securities in order. Securities with a low price to book value ratio are considered to be value because the price paid for the value of the company measured by the book value is low while securities with a high price to book value ratio are considered to be growth. Starting with the security having the lowest price to book value ratio, the securities are added to the value index in increasing order of price to book value ratio until the market capitalization of the value index reaches one-half of the market capitalization of the particular country stock index. The remaining securities are then used to define the growth index.

Style indices formed in the above-described manner have several drawbacks. First, because such constructions rely on only one variable, the price to book value ratio, to determine whether a particular security is to be added to the value index, the relevancy of the resulting indices may be compromised due to data quality, differences in accounting practices from one country to another, lack of relevance of the variable for some industries, etc. Second, the one variable approach also proves to be relatively unstable through time and leads to style indices with significant turnover, an index characteristic that many practitioners consider undesirable. Third, by default, nonvalue securities are defined as growth securities. As a result of this one dimension approach (value or nonvalue), indices constructed in this manner can lead to relatively good value indices but the growth indices are not necessarily reflective of securities of companies with higher than average future growth prospects.

It is also known to form style indices using a two-dimensional approach and multiple variables to independently define value characteristics and growth characteristics of the securities that define the indices. Such constructions recognize that a given security may exhibit a value characteristic, a growth characteristic, a value-and-growth characteristic, or a nonvalue-and-nongrowth characteristic. This two-dimensional approach does not define growth as nonvalue. Rather, this approach uses variables more specific to growth investing to define growth, thereby improving the quality of the growth indices. In addition, the use of multiple variables leads to a more robust and meaningful style classification.

Although style indices constructed in this manner represent an improvement compared to the one variable and one dimension approach, they rely on an appropriate selection and combination of the variables to yield good results. For instance, some of these indices are constructed using only historical accounting data to characterize growth securities. Such constructions fail to accurately address the essence of growth investing, the estimation of future growth prospects. Other such indices are constructed using the price to reported earnings ratio (P/E) to characterize value securities. However, the price to reported earnings ratio can be very unstable due to the very nature of the reported earnings and as such can contribute to higher turnover in the resulting style indices.

Additional shortcomings of style indices constructed in this manner may include an unacceptable level of turnover due to a variety of reasons and a lack of reproducibility. The lack of reproducibility can often be attributed to nondisclosure or nontransparency of the various rules employed for aggregating the various variables into useful scores, for handling securities showing mixed characteristics (e.g., value-and-growth or nonvalue-and-nongrowth), and for allocating securities to the style indices.

SUMMARY

In one general respect, this application discloses embodiments of a method of constructing a value index and a growth index. According to various embodiments, the method includes, determining a value of each variable in a group of variables for each security in a group of securities, determining a standardized score of each variable for each security, and determining an overall value standardized score and an overall growth standardized score for each security. The method further includes positioning each security in a two-dimensional style space and allocating each security to at least one of the growth index and the value index based on each security's distance from an origin of the two-dimensional style space.

In another general respect, this application discloses embodiments of a system for constructing a value index and a growth index. According to various embodiments, the system includes a computing device for determining a value of each variable in a group of variables for each security in a group of securities, determining a standardized score of each variable for each security, and determining an overall value standardized score and an overall growth standardized score for each security. The computing device is further for representing each security as an object in a two-dimensional style space and allocating each security to at least one of the growth index and the value index based on each security's distance from an origin of the two-dimensional style space.

DETAILED DESCRIPTION

Figure 1:
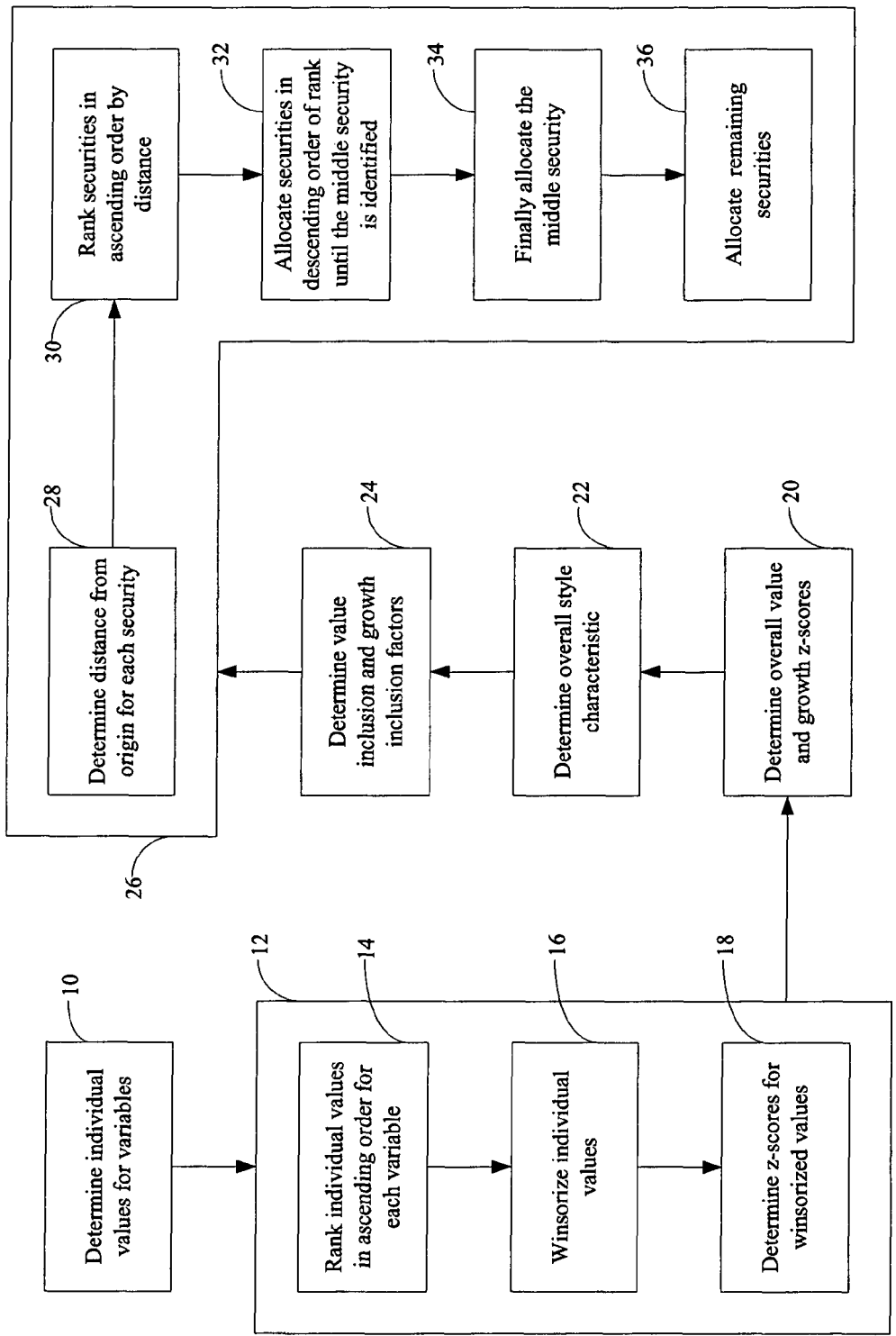
FIG. 1 illustrates a process of constructing a value index and a growth index according to various embodiments.

FIG. 1 illustrates a process of constructing a value index and a growth index according to various embodiments. The process begins at block 10, where individual values of variables used to specify value characteristics and growth characteristics of securities are determined for each security in a group of securities. The securities for which the individual values of the variables are determined may be securities that define an underlying index such as, for example, a country index, a regional index, a market segment index, etc.

Variables associated with value characteristics of the securities are referred to as value variables and include, according to various embodiments, a book value to price ratio, a twelve-month forward earnings to price ratio, and a dividend yield. The individual values of each of these value variables may differ for different securities (e.g., class A, class B, preferred shares, etc.) of the same company due to different security prices. In addition, the dividend rate may differ from one security of a company to another security of the same company. It is understood that, according to various embodiments, individual values may be determined for other value variables such as, for example, a price to sales ratio.

The book value to price ratio (BV/P) for a given security may be defined by the following equation:

$$BV/P = \text{book value per share/price of security} \quad (1)$$

where the most recently reported book value is used to determine the book value per share.

The twelve-month forward earnings to price ratio (E fwd/P) for a given security may be determined by the following equation:

$$E\ fwd/P = EPS_{12F}/\text{price of security} \quad (2)$$

where $EPS_{12F}$ is the twelve-month forward earnings per share estimate, is derived on a rolling basis from a consensus of certain analysts' earnings estimates for fiscal year 1 and fiscal year 2, and may be defined by the following equation:

$$EPS_{12F} = \frac{M * EPS_1 + (12 - M) * EPS_2}{12} \quad (3)$$

where M is the number of months remaining before the fiscal year end, $EPS_1$ is a consensus of the analysts' earnings estimates for fiscal year 1, and $EPS_2$ is a consensus of the analysts' earnings estimates for fiscal year 2. The fiscal year 1 corresponds to the fiscal year following the last fiscal year for which the company has made its results publicly available.

The dividend yield (D/P) may be defined by the following equation:

$$D/P = \text{current annualized dividend per share/price of security} \quad (4)$$

where the current annualized dividend per share is the trailing twelve-month dividend per share derived from the current fiscal year end dividend per share plus the difference between the interim dividend per share of the current fiscal year and the previous fiscal year. For embodiments having securities associated with a United States or Canadian company, the current annualized dividend per share is calculated by annualizing the latest published quarterly dividend. Yields are gross, before withholding tax, and take into account special tax credits when applicable.

Variables associated with growth characteristics of securities are referred to as growth variables and include, according to various embodiments, a long-term forward earnings per share growth rate, a short-term forward earnings per share growth rate, a current internal growth rate, a long-term historical earnings per share growth trend, and a long-term historical sales per share growth trend. For each growth variable, all securities of the same company have the same individual value unless there is a difference in the dividend yield of the securities. Securities that have a different yield will also have a different current internal growth rate. It is understood that, according to various embodiments, individual values may be determined for other growth variables such as, for example, a long-term forward sales per share growth rate.

The long-term forward earnings per share growth rate (LT fwd EPS G) is a consensus of certain analysts' earnings growth rate estimates typically provided for the next three to five years. According to various embodiments, if a security has a long-term forward earnings per share growth rate that is greater than or equal to 50 or less than or equal to −30, the long-term forward earnings per share growth rate of that security may be considered to be missing if contributed by only one analyst.

The short-term forward earnings per share growth rate (ST fwd EPS G) is a growth rate between the twelve-month backward earnings per share and the twelve-month forward earnings per share, and may be defined by the following equation:

$$ST\ forward\ EPS\ G = \frac{EPS_{12F} - EPS_{12B}}{|EPS_{12B}|} \quad (5)$$

where $EPS_{12B}$ is the twelve-month backward earnings per share and may be defined by the following equation:

$$EPS_{12B} = \frac{M*EPS_0 + (12-M)*EPS_1}{12} \quad (6)$$

where M is the number of months remaining before the fiscal year end, $EPS_0$ is the last fiscal year end reported earnings per share, and $EPS_1$ is a consensus of the analysts' earnings estimates for fiscal year 1.

The current internal growth rate (g) may be defined by the following equation:

$$g = ROE*(1-PO) \quad (7)$$

where the return on equity (ROE) is determined using the trailing twelve-month earnings per share divided by the most recently reported book value and the payout ratio (PO) is calculated using the current annualized dividend per share divided by the trailing twelve-month earnings per share. According to various embodiments, the current internal growth rate is considered to be missing if a value is missing for either the return on equity or the payout ratio, and the return on equity is considered to be missing if any of the following conditions are not met:

(a) the book value is positive;
(b) the difference between the book value date and the earnings date is less than eighteen months;
(c) the book value date is older than the earnings date; or
(d) the issuer results are consolidated for both book value and earnings or are not consolidated for both book value and earnings.

The long-term historical earnings per share growth trend (LT his EPS G) may be defined by the following equation:

$$LT\ his\ EPS\ G = \frac{a_{EPS}}{|\widetilde{E\widetilde{P}S}|} \quad (8)$$

According to various embodiments, the long-term historical earnings per share growth trend (LT his EPS G) may be determined by applying a regression such as, for example, the ordinary least square method, to the yearly restated earnings per share for the previous four or five years, then determining the average absolute earnings per share. The regression may be applied using the following equation:

$$EPS_t = a_{EPS}*t + b \quad (9)$$

where "$a_{EPS}$" is the slope coefficient, "t" is the year expressed in number of months, and "b" is the intercept. The average absolute earnings per share may be determined using the following equation:

$$\widetilde{E\widetilde{P}S} = \sum_{t=1}^{n} \frac{|EPS_t|}{n} \quad (10)$$

Similarly, the long-term historical sales per share growth trend (LT his SPS G) may be defined by the following equation:

$$LT\ his\ SPS\ G = \frac{a_{SPS}}{|\widetilde{S\widetilde{P}S}|} \quad (11)$$

According to various embodiments, the long-term historical sales per share growth trend (LT his SPS G) may be determined by applying a regression such as, for example, the ordinary least square method, to the yearly restated sales per share for the previous four or five years, then determining the average absolute sales per share. The regression may be applied using the following equation:

$$SPS_t = a_{SPS}*t + b \quad (12)$$

where "$a_{SPS}$" is the slope coefficient, "t" is the year expressed in number of months, and "b" is the intercept. The average absolute sales per share may be determined using the following equation:

$$\widetilde{S\widetilde{P}S} = \sum_{t=1}^{n} \frac{|SPS_t|}{n} \quad (13)$$

According to various embodiments, if the last four or five years of data are not available to determine the long-term historical earnings per share growth trend for a particular security, the long-term historical earnings per share growth trend is considered to be missing for that security. Similarly, if the last four or five years of data are not available to determine the long-term historical sales per share growth trend for a particular security, the long-term historical sales per share growth trend is considered to be missing for that security. According to various embodiments, individual values are not determined for the long-term historical sales per share growth trend for securities of certain financial companies. Such companies may include, for example, companies classified as banks and diversified financials industry groups, other than those classified in the multi-sector holdings sub-industry, under the global industry classification standard (GICS®).

From block 10, the process advances to block 12, where a standardized score of each variable is determined for each security. According to various embodiments, the determination of the standardized scores may be embodied as a multi-step process as shown in blocks 14-18. The process of determining the standardized scores begins at block 14, where the individual values of the variables are ranked in order for each variable. Thus, an ordered ranking of the individual values is established for each value variable and for each growth value. According to various embodiments, any missing values are excluded from the rankings.

From block 14, the process of determining the standardized scores advances to block 16, where the individual values of the variables are then winsorized for each value variable and for each growth variable. Winsorizing the individual values of the variables may serve to temper the effect that outlier values have in determining the standardized scores. According to various embodiments, the winsorization of the individual values of the variables includes determining a minimum acceptable value and a maximum acceptable value for each variable. After the minimum and maximum acceptable values are determined for each variable, any values of a variable ranked below the minimum acceptable value of that variable are set equal to the minimum acceptable value of that variable and any values of a variable ranked above the maximum acceptable value of that variable are set equal to the maximum acceptable value of that variable. According to various embodiments, the minimum acceptable value of a given variable may be set equal to the $5^{th}$ percentile value of that variable and the maximum acceptable value of that variable may be set equal to the $95^{th}$ percentile value of that variable. It is understood that, according to other embodiments, other percentile values may be used to set the minimum and maximum acceptable values for each variable, respectively. Thus, according to various embodiments, each variable may have a different minimum acceptable value and each variable may have a different maximum acceptable value.

It is also understood that, according to various embodiments, the process employed to winsorize the individual values of each variable may be a process other than the one described hereinabove. For example, values ranked below the minimum acceptable value or above the maximum acceptable value may be removed and considered to be missing. According to other embodiments, the minimum and maximum acceptable values may be determined using market capitalization weighted percentiles instead of equal weighted percentiles.

From block 16, the process of determining the standardized scores advances to block 18, where standardized scores of the winsorized values are determined. According to various embodiments, the standardized scores may be embodied as z-scores. The z-score may be defined by the following equation:

$$Z = \frac{(x - \mu_{variable})}{\sigma_{variable}} \tag{14}$$

where "x" is the winsorized value of a given variable for a given security, "$\mu_{variable}$" is the free float-adjusted market capitalization weighted market mean of the given variable, and "$\sigma_{variable}$" is the free float-adjusted market capitalization weighted market standard deviation of the given variable. The free-float adjusted market capitalization weighted market mean of a given variable may be defined by the following equation:

$$\mu_{variable} = \sum_i \left[ \left( \frac{Shares_i \times P_i \times FIF_i}{\sum_i Shares_i \times P_i \times FIF_i} \right) \times Variable_i^{winsorized} \right] \tag{15}$$

where "i" is the number of securities within the group of securities, "Shares" is the relevant number of shares of the given security which applies for the group of securities (e.g., the index number of shares, the total number of shares outstanding, etc.), "P" is the price of the given security, and "FIF" is a foreign inclusion factor. The foreign inclusion factor represents the free float market capitalization available to international investors, and the value of the foreign inclusion factor may range from zero to one. According to various embodiments, a domestic inclusion factor (DIF) may be used in lieu of the foreign inclusion factor when determining the free-float adjusted market capitalization weighted market mean of a given variable. The domestic inclusion factor represents the free float market capitalization available to domestic investors. The free float-adjusted market capitalization weighted market standard deviation of a given variable may be defined by the following equation:

$$\sigma_{variable} = \sqrt{\sum_i \left( \frac{Shares_i \times P_i \times FIF_i}{\sum_i Shares_i \times P_i \times FIF_i} \right) \times (Variable_i^{winsorized} - \mu_{variable})^2} \tag{16}$$

According to various embodiments, securities with missing variables are not included in the free float-adjusted market capitalization weighted market mean and the free float-adjusted market capitalization weighted market standard deviation.

It is understood that according to various embodiments, the process employed to determine the standardized scores may be a process other than the one described hereinabove. It is also understood that, according to various embodiments, the standardized scores may be standardized scores other than z-scores. For example, the standardized scores may be embodied as u-scores. The u-score may be determined by dividing the difference between the winsorized value of a given variable for a given security and the lowest value of the given variable by the range of the values of the given variable. However, for ease of description purposes, the standardized scores will be described hereinafter as z-scores.

From block 12, the process advances to block 20, where an overall value z-score and an overall growth z-score is determined for each security. For a given security, the overall value z-score for that security is determined, according to various embodiments, by determining an equally-weighted average of the value z-scores that are available for that security. Thus, according to such embodiments, only value z-scores that are available are used for the calculation and value z-scores that are missing are excluded from the determination. For example, for a security having value z-scores that are available for the book value to price ratio variable, the twelve month forward earnings to price ratio variable, and the dividend yield variable, the overall value z-score for that security may be defined by the following equation:

$$\text{Overall Value Z-Score} = \frac{1}{3}(Z_{BV/P} + Z_{E\,fwd/P} + Z_{D/P}) \quad (17)$$

For a security that only has value-z-scores available for the book value to price ratio variable and the dividend yield variable, the overall z-score for that security may be defined by the following equation:

$$\text{Overall Value Z-score} = \frac{1}{2}(Z_{BV/P} + Z_{D/P}) \quad (18)$$

It is understood that, according to various embodiments, the process employed to determine the overall value z-scores may be a process other than the one described hereinabove. For example, missing z-scores of value variables of a particular security may be set equal to zero and be included in the determination of the equally-weighted average of the value z-scores for the security. According to other embodiments, the individual z-scores of value variables may be weighted based on other weighting schemes.

For a given security, the overall growth z-score for that security is determined, according to various embodiments, by determining a weighted average of all the growth z-scores for that security, including growth z-scores that are missing. According to various embodiments, the z-score for the long-term forward earnings per share growth trend is given a double weight for each security and growth z-scores that are missing are set to zero. Thus, according to such embodiments, the overall growth z-score for a security may be defined by the following equation:

$$\text{Overall Growth Z-Score} = \frac{1}{6}(2*Z_{LT\,fwd\,eps\,G} + Z_{ST\,fwd\,EPS\,G} + Z_g + Z_{LT\,his\,EPS\,G} + Z_{LT\,his\,SPS\,G}) \quad (19)$$

When a long-term forward earnings per share growth rate is missing for a security, the overall growth z-score for the security may be defined by the following equation:

$$\text{Overall Growth Z-Score} = \frac{1}{6}(Z_{ST\,fwd\,EPS\,G} + Z_g + Z_{LT\,his\,EPS\,G} + Z_{LT\,his\,SPS\,G}) \quad (20)$$

According to various embodiments, the long-term historical sales per share growth trend is not determined for securities of certain financial companies. Such companies may include, for example, companies classified in the banks and diversified financials industry groups, other than those classified in the multi-sector holdings sub-industry, under the global industry classification standard (GICS®). For such embodiments, the overall growth z-score may be defined by the following equation:

$$\text{Overall Growth Z-Score} = \frac{1}{5}(2*Z_{LT\,fwd\,eps\,G} + Z_{ST\,fwd\,EPS\,G} + Z_g + Z_{LT\,his\,EPS\,G}) \quad (21)$$

It is understood that, according to various embodiments, the process employed to determine the overall growth z-scores may be a process other than the one described hereinabove. For example, for a given security, missing growth z-scores may be excluded when determining the overall growth z-score for that security. According to other embodiments, the individual z-scores of growth variables may be weighted differently than described above.

From block 20, the process advances to block 22, where an overall style characteristic is determined for each security. Determining an overall style characteristic for each security includes individually designating the overall style characteristic for each security as one of value, growth, value-and-growth, and nonvalue-and-nongrowth according to the following table:

| Overall Value Z-Score | Overall Growth Z-Score | Overall Style Characteristic |
|---|---|---|
| Positive | Negative or Zero | Value |
| Negative or Zero | Positive | Growth |
| Positive | Positive | Value-and-Growth |
| Negative or Zero | Negative or Zero | Nonvalue-and-Nongrowth |

Thus, for a security having a positive overall value z-score and a negative or zero overall growth z-score, the overall style characteristic of that security is designated as value. For a security having a negative or zero overall value z-score and a positive overall growth z-score, the overall style characteristic of that security is designated as growth. For a security having a positive overall value z-score and a positive overall growth z-score, the overall style characteristic of that security is designated as value-and-growth. For a security having a negative or zero overall value z-score and a negative or zero overall growth z-score, the overall style characteristic of that security is designated as nonvalue-and-nongrowth.

From block 22, the process advances to block 24, where a value inclusion factor and a growth inclusion factor are determined for each security. The value inclusion factor may represent the proportion of a security's free-float adjusted market capitalization that will be subsequently allocated to the value index and the growth inclusion factor may represent an estimation of the proportion of a security's free-float adjusted market capitalization that will be subsequently allocated to the growth index.

According to various embodiments, for a given security, a sum of the value inclusion factor of that security and the growth inclusion factor of that security is equal to one. For a security having an overall style characteristic designated as value, the value inclusion factor for that security is set to one and the growth inclusion factor for that security is set to zero. For a security having an overall style characteristic designated as growth, the value inclusion factor for that security is set to zero and the growth inclusion factor for that security is set to one. For a security having an overall style characteristic designated as one of value-and-growth or nonvalue-and-nongrowth, the value inclusion factor for that security is set to a value ranging from zero to one and the growth inclusion factor for that security is set to a value ranging from zero to one, where the sum of the value inclusion factor and the growth inclusion factor is equal to one.

According to various embodiments, for a given security having an overall style characteristic designated as one of value-and-growth or nonvalue-and-nongrowth, the value inclusion factor for the given security may be set to one of a fixed group of values ranging from zero to one. For example, the value inclusion factor for the given security may be set to 1, 0.65, 0.5, 0.35, or 0 and the growth inclusion factor for the given security may be set to 1, 0.65, 0.5, 0.35, or 0, where the sum of the value inclusion factor and the growth inclusion factor is equal to one. It is understood that, according to various embodiments, the fixed group of values ranging from zero to one may include other values between zero and one, and the fixed group of values may include more than or less than five discrete values.

Figure 2:
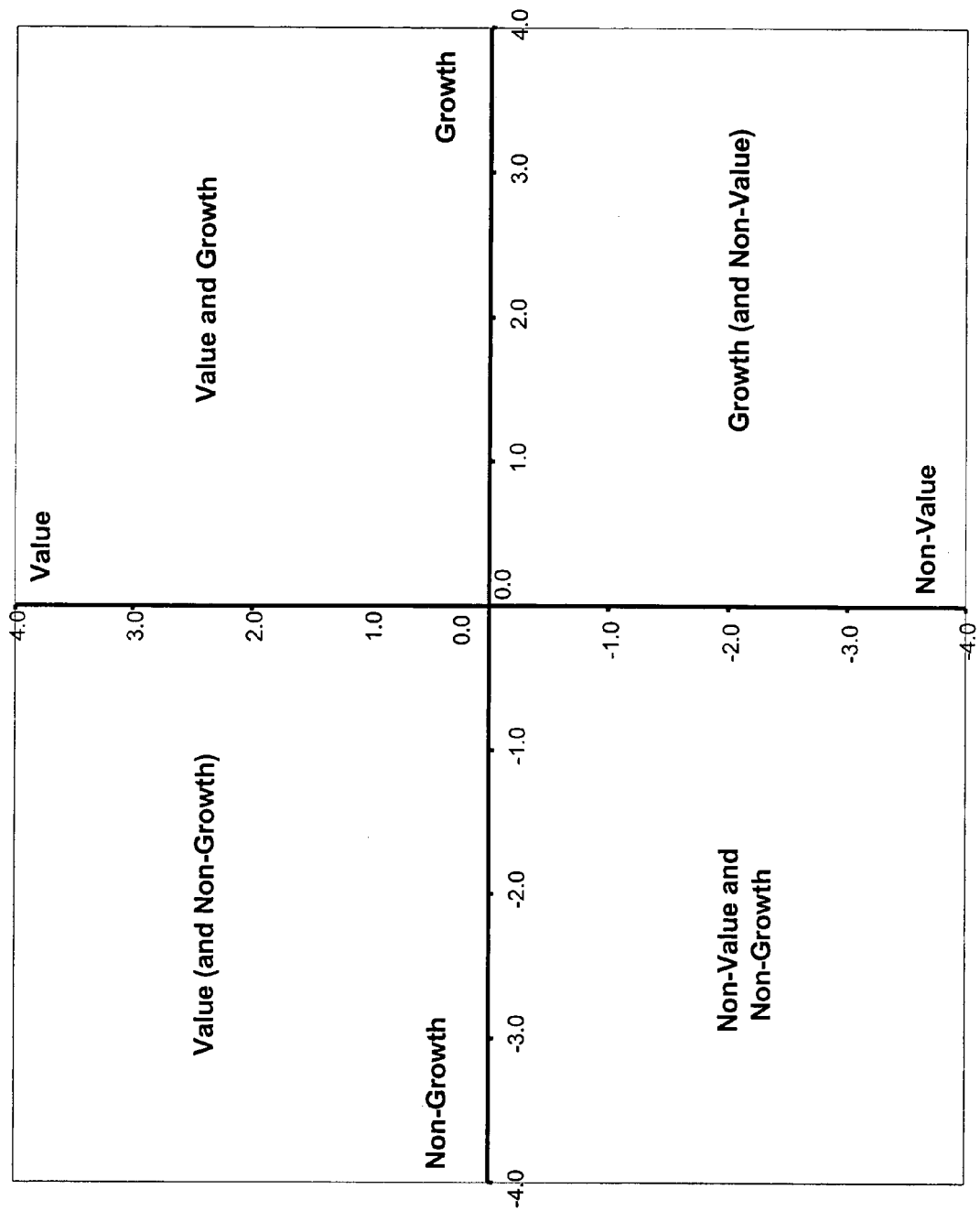
FIG. 2 is a graphical representation of a two-dimensional value and growth style space according to various embodiments.

For a security having an overall style characteristic designated as one of value-and-growth or nonvalue-and-nongrowth, a two-dimensional representation of a value and growth style space may be used to determine the specific value for the value inclusion factor and the specific value for the growth inclusion factor of that security. According to various embodiments, the two-dimensional value and growth style space is defined by a first coordinate axis that may be designated as a growth/nongrowth axis and by a second coordinate axis that may be designated as a value/nonvalue axis as shown in FIG. 2. The values marked on the first coordinate axis are overall growth z-scores and the values marked on the second coordinate axis are overall value z-scores. The intersection of the first and second coordinate axes defines the origin of the two-dimensional value and growth style space. For a given security, the overall value z-score and the overall growth z-score of the given security may be used to position the given security within the two-dimensional value and growth style space. For example, the security may be represented as an object in the two-dimensional value and growth style space, where the overall growth z-score of the security defines the horizontal coordinate of the center of the object and the overall value z-score of the security defines the vertical coordinate of the center of the object.

For a security having an overall style characteristic designated as one of value-and-growth or nonvalue-and-nongrowth, the specific value for the value inclusion factor and the corresponding value for the growth inclusion factor may be determined based on the position of the security within the two-dimensional value and growth style space. More specifically, the specific value for the value inclusion factor and the corresponding value for the growth inclusion factor may be determined based on the relative contributions of the overall value z-score and the overall growth z-score of that security to that security's distance from the origin of the two-dimensional value and growth style space. According to various embodiments, the relative contributions of the overall value z-score and the overall growth z-score may be defined by the following equations:

$$\text{Value contribution} = \frac{\text{value z-score}^2}{\text{distance}^2} = \frac{\text{value z-score}^2}{\text{value z-score}^2 + \text{growth z-score}^2} \quad (22)$$

$$\text{Growth contribution} = \frac{\text{growth z-score}^2}{\text{distance}^2} = \frac{\text{growth z-score}^2}{\text{value z-score}^2 + \text{growth z-score}^2} \quad (23)$$

When the overall value z-score of a given security is double the overall growth z-score of that security, the relative contribution of the security's overall value z-score to the security's distance from the origin is 80%. For a given security having an overall style characteristic designated as value-and-growth, the value style characteristic of the security is deemed to clearly dominate the growth style characteristic of the security when the overall value z-score of the security contributes at least 80% to the security's distance from the origin. According to various embodiments, the value inclusion factor for such a security may be set equal to one. However, for a given security having an overall style characteristic designated as nonvalue-and-nongrowth, the growth style characteristic of the security is deemed to clearly dominate the value style characteristic of the security when the overall value z-score (which is negative) contributes at least 80% to the security's distance from the origin. According to various embodiments, the growth inclusion factor for such a security may be set equal to one.

Similarly, when the overall growth z-score of a given security is double the overall value z-score of that security, the relative contribution of the security's overall growth z-score to the security's distance from the origin is 80%. For a given security having an overall style characteristic designated as value-and-growth, the growth style characteristic of the security is deemed to clearly dominate the value style characteristic of the security when overall growth z-score of the security contributes at least 80% to the security's distance from the origin. According to various embodiments, the growth inclusion factor for such a security may be set equal to one. However, for a given security having an overall style characteristic designated as nonvalue-and-nongrowth, the value style characteristic of the security is deemed to clearly dominate the growth style characteristic of the security when the overall growth z-score (which is negative) contributes at least 80% to the security's distance from the origin. According to various embodiments, the value inclusion factor for such a security may be set equal to one.

For embodiments where the value inclusion factor of a security having an overall style characteristic designated as value-and-growth may only be set to 1, 0.65, 0.5, 0.35, or 0, the value inclusion factor is set to one when the relative contribution of the overall value z-score to the security's distance from the origin reaches or exceeds a first predetermined percentage, to 0.65 when the relative contribution reaches or exceeds a second predetermined percentage that is less than the first predetermined percentage, to 0.5 when the relative contribution reaches or exceeds a third predetermined percentage that is less than the second predetermined percentage, to 0.35 when the relative contribution reaches or exceeds a fourth predetermined percentage that is less than the third predetermined percentage, and to zero when the relative contribution is less than the fourth predetermined percentage. With respect to the corresponding growth inclusion factor, the growth inclusion factor is set to a value such that the sum of the value inclusion factor and the growth inclusion factor is equal to one.

Similarly, for embodiments where the value inclusion factor of a security having an overall style characteristic designated as nonvalue-and-nongrowth may only be set to 1, 0.65, 0.5, 0.35, or 0, the value inclusion factor is set to zero when the relative contribution of the overall value z-score to the security's distance from the origin reaches or exceeds a first predetermined percentage, to 0.35 when the relative contribution reaches or exceeds a second predetermined percentage that is less than the first predetermined percentage, to 0.5 when the relative contribution reaches or exceeds a third predetermined percentage that is less than the second predetermined percentage, to 0.65 when the relative contribution reaches or exceeds a fourth predetermined percentage that is less than the third predetermined percentage, and to one when the relative contribution is less than the fourth predetermined percentage. With respect to the corresponding growth inclusion factor, the growth inclusion factor is set to a value such that the sum of the value inclusion factor and the growth inclusion factor is equal to one.

Figure 3:
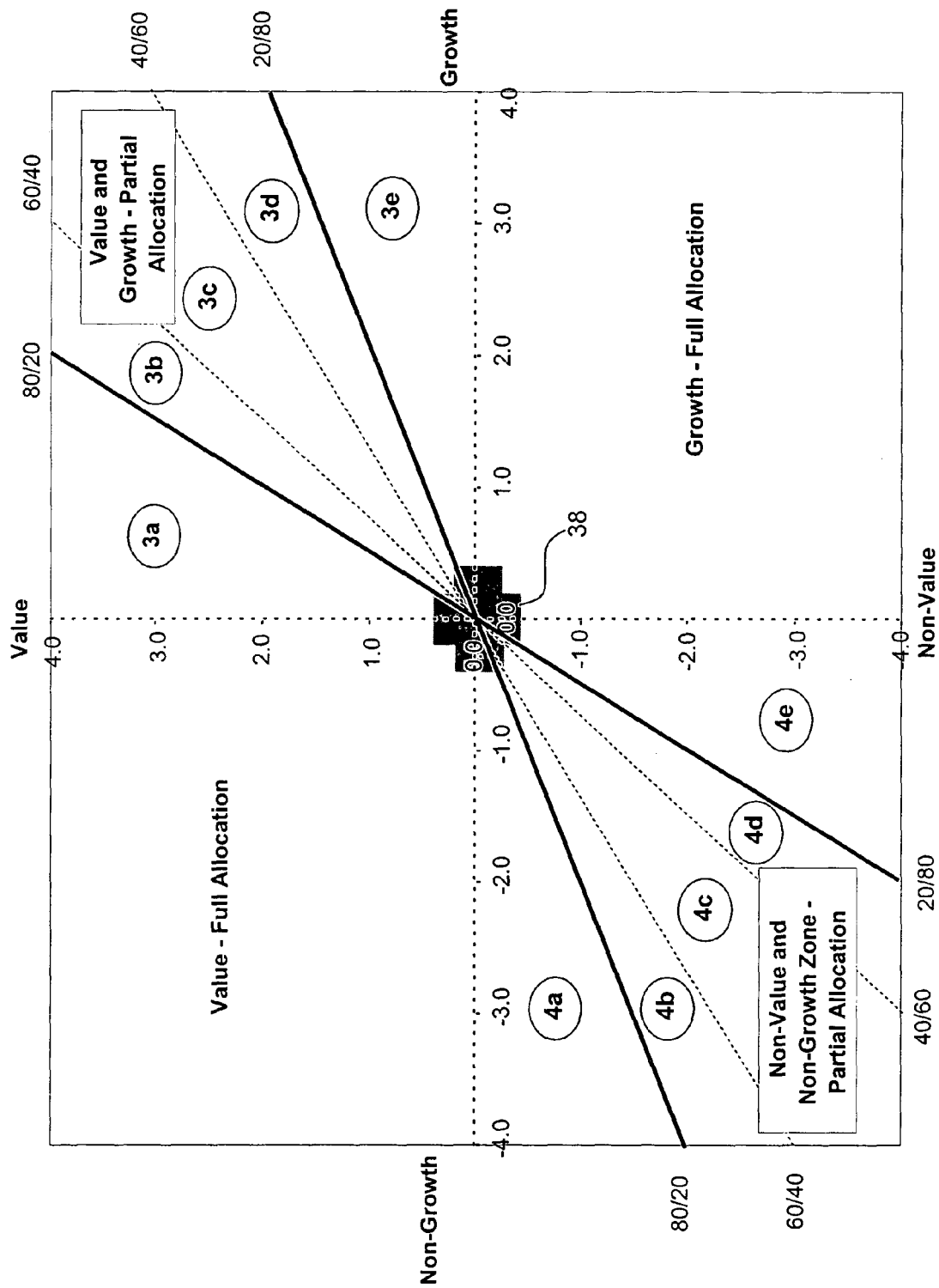
FIG. 3 is a graphical representation of a two-dimensional value and growth style space according to various embodiments.

According to various embodiments, the first predetermined percentage is 80%, the second predetermined percentage is 60%, the third predetermined percentage is 40%, and the fourth predetermined percentage is 20%. The predetermined percentages may be used to define various areas in the two-dimensional value and growth style space as shown in FIG. 3. For example, areas 3a-3e and 4a-4e of the two-dimensional value and growth style space shown in FIG. 3 may be defined by the predetermined percentages. Each defined area of the two-dimensional value and growth style space may have a specific value inclusion factor and a specific growth inclusion factor associated therewith. For example, area 3a may correspond to a value inclusion factor of one, area 3b may correspond to a value inclusion factor of 0.65, area 3c may correspond to a value inclusion factor of 0.5, area 3d may correspond to a value inclusion factor of 0.35, and area 3e may correspond to a value inclusion factor of zero. Similarly, area 4a may correspond to a value inclusion factor of one, area 4b may correspond to a value inclusion factor of 0.65, area 4c may correspond to a value inclusion factor of 0.5, area 4d may correspond to a value inclusion factor of 0.35, and area 4e may correspond to a value inclusion factor of zero. It is understood that, according to various embodiments, the first, second, third and fourth predetermined percentages may be percentages other than 80%, 60%, 40%, and 20%, respectively. It is also understood that, according to various embodiments, a different number of predetermined percentages may be used to define a different number of areas within the two-dimensional value and growth style space, where each area has a particular value inclusion factor and a particular growth inclusion factor associated therewith.

According to various embodiments, a distance other than the Euclidian distance may be used to determine the values for the value inclusion factor and the growth inclusion factor of a given security. For example, the Manhattan distance or the Minkowski distance may be used. However, for ease of description purposes, the distance from the origin will be described hereinafter as a Euclidian distance.

According to various embodiments, processes other than those described hereinabove may be employed to determine the values for the value inclusion factor and the growth inclusion factor of a given security. For example, according to various embodiments, the angle between the horizontal axis of the two-dimensional value and growth style space and the line between the origin and the position of the security within the two-dimensional value and growth style space may be used to determine the values for the value inclusion factor and the growth inclusion factor. According to such embodiments, predetermined angle ranges may define the various values for the value inclusion factor and the growth inclusion factor.

From block 24, the process advances to block 26, where each security is allocated to at least one of the value index and the growth index. According to various embodiments, the process of allocating the securities may be embodied as a multi-step process as shown in blocks 28-36. The process of allocating the securities begins at block 28, where the distance from the origin of the two-dimensional value and growth style space is determined for each security. The distance of a given security from the origin is indicative of the relative strengths of the value and growth style characteristics of the security. For each security, the distance from the origin may be defined by the following equation:

$$d = \sqrt{\text{valuez-score}^2 + \text{growthz-score}^2} \quad (24)$$

From block 28, the process advances to block 30, where the securities are ranked in order by distance from the origin. According to various embodiments, if two securities are the same distance from the origin, the security having the larger free float-adjusted market capitalization is ranked higher than the security having the lower free float-adjusted market capitalization.

From block 30, the process advances to block 32, where, starting with the security furthest from the origin, the securities are allocated to the value index and/or the growth index one by one in descending order of distance from the origin until adding a security to either the value index and/or the growth index results in the cumulative weight of one of the indices exceeding a predetermined target percentage of the free float-adjusted market capitalization of all the securities. According to various embodiments, the predetermined target percentage is 50%. According to other embodiments, the predetermined target percentage may be a percentage other than 50%.

The allocation of a given security to the value index and/or the growth index at block 32 may be based on the value of the value inclusion factor and the value of the growth inclusion factor for that security. For example, if the value inclusion factor of the security is equal to one, then the security is fully allocated to the value index (i.e., 100% of the security's free float-adjusted market capitalization weight is allocated to the value index). Similarly, if the growth inclusion factor is equal to one, then the security is fully allocated to the growth index. If the value inclusion factor is 0.65 and the growth inclusion factor is 0.35, then the security is partially allocated to the value index and partially allocated to the growth index. More specifically, 65% of the security's free float-adjusted market capitalization weight is allocated to the value index and 35% of the security's free float-adjusted market capitalization weight is allocated to the growth index. If the value inclusion factor is 0.5 and the growth inclusion factor is 0.5, then the security is partially allocated to the value index and partially allocated to the growth index. More specifically, 50% of the security's free float-adjusted market capitalization weight is allocated to the value index and 50% of the security's free float-adjusted market capitalization weight is allocated to the growth index. If the value inclusion factor is 0.35 and the growth inclusion factor is 0.65, then the security is partially allocated to the value index and partially allocated to the growth index. More specifically, 35% of the security's free float-adjusted market capitalization weight is allocated to the value index and 65% of the security's free float-adjusted market capitalization weight is allocated to the growth index. The security that suspends the allocation process of block 32 is designated as the middle security. The value inclusion factor and the growth inclusion factor for the middle security can each range from zero to one as long as the sum of the value inclusion factor and the growth inclusion factor is equal to one.

From block 32, the process advances to block 34, where a final allocation of the middle security is determined. Finally allocating the middle security includes first determining whether the free float-adjusted market capitalization weight of the middle security is less than, equal to, or greater than a predetermined portion of the free float-adjusted market capitalization of all the securities. According to various embodiments, the predetermined portion is 5% of the free float-adjusted market capitalization of all the securities. According to other embodiments, the predetermined portion may be more than or less than 5% of the free float-adjusted market capitalization of all the securities.

According to various embodiments, if the free float-adjusted market capitalization weight of the middle security is less than or equal to the predetermined portion of the free float-adjusted market capitalization of all the securities, the middle security is fully allocated to the index that is closest to the predetermined target percentage once the middle security is fully allocated thereto, regardless of the value inclusion factor and the growth inclusion factor of the middle security.

Thus, once the middle security is fully allocated to one of the value index and the growth index, the resulting cumulative weight of the value index can be greater than, less than, or equal to the predetermined target percentage and the resulting cumulative weight of the growth index can be greater than, less than, or equal to the predetermined target percentage. However, if the free float-adjusted market capitalization weight of the middle security is greater than the predetermined portion of the free float-adjusted market capitalization of all the securities, the middle security is either fully allocated to one of the indices or partially allocated to both of the indices, regardless of the value inclusion factor and the growth inclusion factor of the middle security. The middle security is fully allocated to one of the indices if doing so results in the cumulative free float-adjusted market capitalization weight of the index being closest to the predetermined target percentage, or partially allocated to the value index and the growth index if doing so results in the cumulative free float-adjusted market capitalization weight of one of the indices being closest to the predetermined target percentage. Thus, once the middle security is finally allocated, the resulting cumulative weight of the value index can be greater than, less than, or equal to the predetermined target percentage and the resulting cumulative weight of the growth index can be greater than, less than, or equal to the predetermined target percentage. Therefore, depending on the outcome of the final allocation of the middle security, the cumulative weight of neither the value index nor the growth index may reach the predetermined target percentage.

From block 34, the process advances to block 36, where the remaining securities are allocated in descending order of distance from the origin. If the final allocation of the middle security results in neither index reaching the predetermined target percentage, the remaining securities are allocated one by one in descending order of distance from the origin by the process described in block 34 until one of the indices exceeds the predetermined target percentage. Once the predetermined target percentage is exceeded for one index, each unallocated security is allocated to the index that has not yet reached the predetermined target percentage, regardless of the value inclusion factor and the growth inclusion factor of the security.

Figure 4:
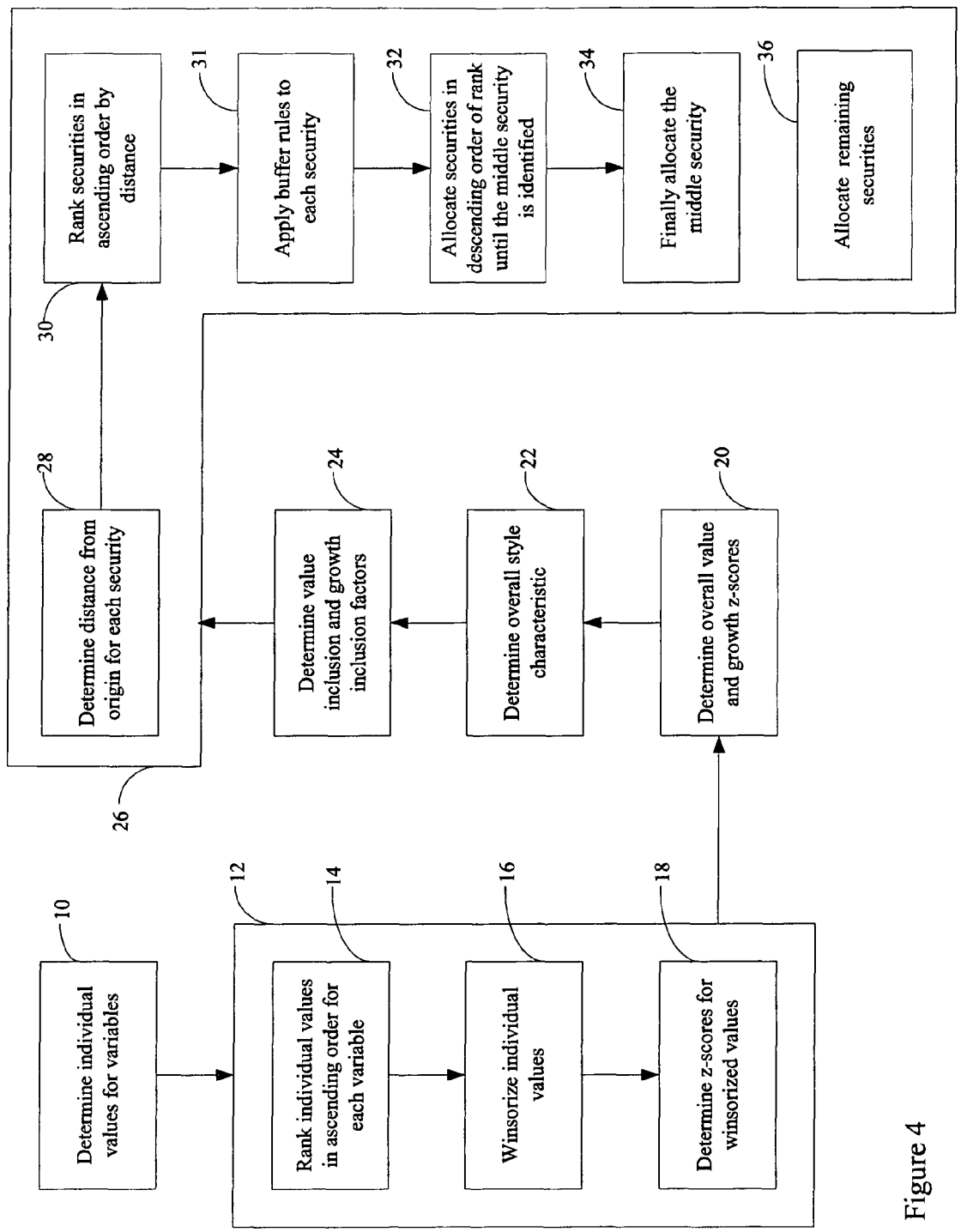
FIG. 4 illustrates a process of reallocating securities associated with a value index and a growth index according to various embodiments.

FIG. 4 illustrates a process of reallocating securities associated with a value index and a growth index according to various embodiments. The securities may also define an underlying index such as, for example, a country index, a regional index, a market segment index, etc. After a value index and an associated growth index are constructed, it is desirous to maintain the continuity of the indices and to minimize unnecessary index turnover. The reallocation process may be employed at any time. According to various embodiments, the reallocation process may be employed on a periodic basis such as, for example, a daily basis, a monthly basis, a quarterly basis, a semi-annual basis, a yearly basis, etc.

The process of reallocating the securities begins at block 10, where new individual values are determined for each variable for each security. The variables may be the same variables as described hereinabove with respect to FIG. 1, and the new individual values may be determined in a manner similar to that described in block 10 of FIG. 1. According to various embodiments, the various data used to determine the individual values may be updated at different frequencies, and certain data may be updated on a periodic basis.

From block 10, the reallocation process advances to block 12, where a new z-score is determined for each variable for each security. The new z-scores may be determined in a manner similar to that described in blocks 12-18 of FIG. 1, but are determined based on the new individual values. From block 12, the reallocation process advances to block 20, where a new overall value z-score and a new overall growth z-score is determined for each security. The new overall z-scores may be determined in a manner similar to that described in block 20 of FIG. 1, but are determined based on the new z-scores. From block 20, the reallocation process advances to block 22, where new overall style characteristics are determined for each security. The new overall style characteristics may be determined in a manner similar to that described in block 22 of FIG. 1, but are determined based on the new overall z-scores. From block 22, the reallocation process advances to block 24, where new value inclusion factors and new growth inclusion factors are determined for each security. The new value inclusion factors and the new growth inclusion factors may be determined in a manner similar to that described in block 24 of FIG. 1, but are determined based on the new overall style characteristics.

From block 24, the reallocation process advances to block 26, where each security is reallocated to at least one of the value index and the growth index. According to various embodiments, the process of reallocating the securities may be embodied as a multi-step process as shown in blocks 28-36. The process of reallocating the securities begins at block 28, where the distance from the origin of the two-dimensional value and growth style space is determined for each security. The distances may be determined in a manner similar to that described in block 28 of FIG. 1, but are determined based on the new overall z-scores. From block 28, the process of reallocating the securities advances to block 30, where the securities are ranked in order by distance from the origin. The securities may be ranked in a manner similar to that described in block 30 of FIG. 1.

From block 30, the process of reallocating the securities advances to block 31, where buffer rules are applied to each security to determine whether the value inclusion factors and the growth inclusion factors determined at block 24 should be reset for certain securities. According to various embodiments, a given two-dimensional value and growth style space may include a predefined buffer area 38. An example of a predefined buffer area 38 is shown in FIG. 3. For each security falling within the predefined buffer area 38, the value inclusion factor and the growth inclusion factor for that security are reset to the values that existed prior to the establishment of the new values at block 24. For each security falling outside the predefined buffer area 38, the value inclusion factor and the growth inclusion factor for that security remain at the new values established at block 24. Application of the buffer rules helps to maintain the continuity of the indices by limiting index turnover caused by the migration of securities from the value index to the growth index and from the growth index to the value index.

The predefined buffer area 38 may be any size and shape. According to various embodiments, the predefined buffer area 38 may be defined by the union of a first rectangle longitudinally bisected by the value axis and a second rectangle longitudinally bisected by the growth axis as shown in FIG. 3. According to various embodiments, the first rectangle is a vertical rectangle defined by an overall value z-score between +/−0.4 and an overall growth z-score between +/−0.2, and the second rectangle is a horizontal rectangle defined by an overall value z-score between +/−0.2 and an overall growth z-score between +/−0.4. It is understood that, according to other embodiments, the predefined buffer area 38 may be defined by other overall z-score values.

From block 31, the process advances to blocks 32-36, where the securities may be allocated in a manner similar to that described in blocks 32-36 of FIG. 1, but the new value inclusion factors and the new growth inclusion factors are used for those securities falling outside the predefined buffer area 38, and the reset values are used for those securities falling within the predefined buffer area 38.

Figure 5:
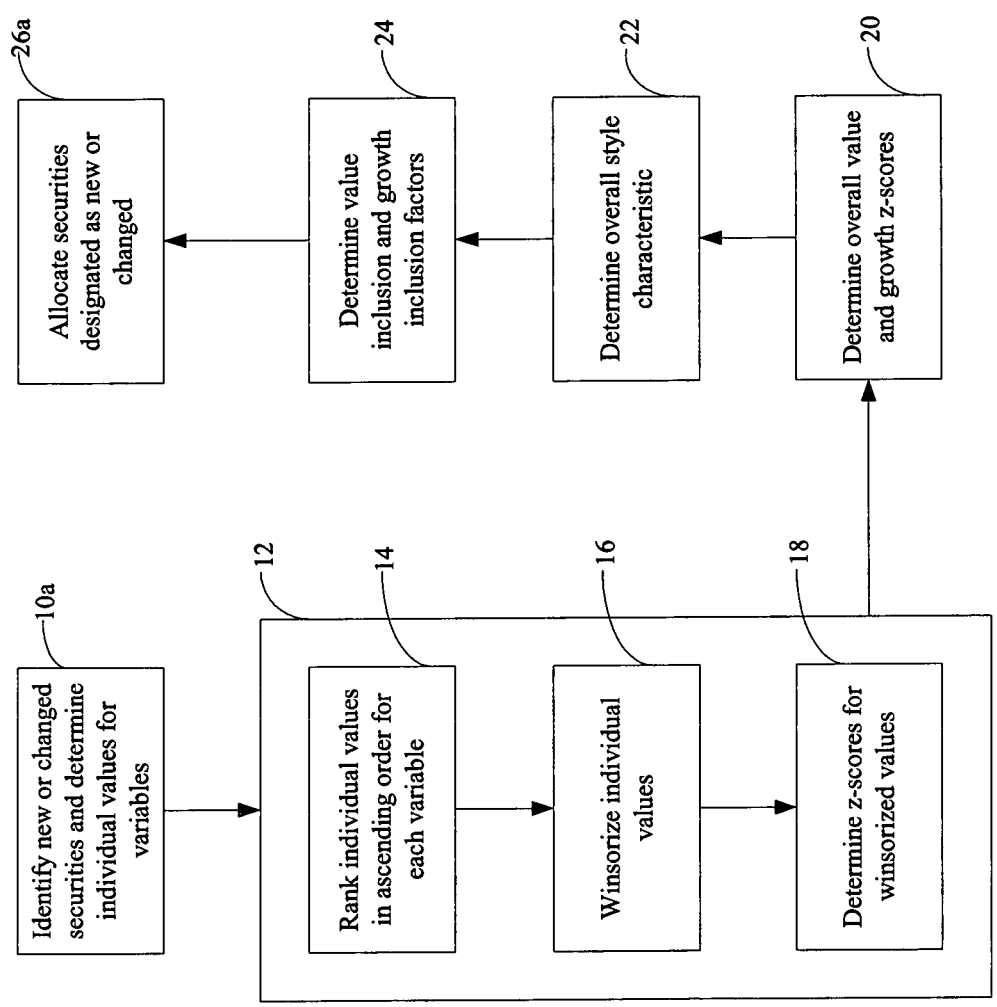
FIG. 5 illustrates a process of revising a growth index and a value index according to various embodiments.

FIG. 5 illustrates a process of revising a value index and a growth index according to various embodiments. Under certain circumstances, it may be desirous to revise a value index and/or an associated growth index. For example, if the value index and the growth index are associated with an underlying index, additions or deletions to the underlying index may warrant changes to the value index and/or the growth index. It may also be desirous to revise a value index and/or an associated growth index if a corporation associated with the value index and/or the growth index experiences a significant corporate event or events that results in the full market capitalization of a given security increasing by a first amount defined as significant or decreasing by a second amount also defined as significant. Such events may include, for example, mergers and acquisitions, spin-offs, and large initial public offerings.

The process of revising the growth index and the value index begins at block 10a, where each security in a group of securities that define the value index and the growth index is designated as one of existing, new and changed. The securities may also define an underlying index such as, for example, a country index, a regional index, a market segment index, etc. A given security is designated as existing if it is not designated as new or changed. A given security is designated as new if it is to be added to the value index and/or the growth index.

According to various embodiments, a given security is designated as changed if its full market capitalization has increased by a first amount defined as significant or decreased by a second amount also defined as significant. According to various embodiments, the first amount may be defined as significant when the first amount is equal to or greater than 50% of the security's pre-event full market capitalization, and the second amount may be defined as significant when the second amount is equal to or greater than 33% of the security's pre-event full market capitalization. It is understood that, according to other embodiments, the first and second amounts may be defined as significant when the first and second amounts are equal to or greater than percentages other than 50% and 33%, respectively, of the security's pre-event full market capitalization.

According to other embodiments, the given security is not designated as changed even if its full market capitalization has increased by the first amount or decreased by the second amount, if any of the following apply:
 (a) the increase in the given security's full market capitalization is due to issuances of new shares in order to raise cash, unless the cash is to be used to pay for an acquisition within a predetermined time period;
 (b) the decrease in the given security's full market capitalization is due to buybacks of shares; or
 (c) the given security has the same value inclusion factor as a second security, where a first corporation associated with the given security is involved in a merger with or an acquisition of a second corporation associated with the second security, and where the first and second corporations are chartered in the same country.

Once the securities have been designated as existing, new or changed, new individual values are determined for each variable for each security designated as new or changed. The variables may be the same variables as described hereinabove with respect to FIG. 1, and the individual values may be determined in a manner similar to that described in block 10 of FIG. 1.

From block 10a, the revision process advances to block 12, where a z-score is determined for each variable for each security designated as new or changed. The z-scores may be determined in a manner similar to that described in blocks 12-18 of FIG. 1. From block 12, the revision process advances to block 20, where an overall value z-score and an overall growth z-score is determined for each security designated as new or changed. The overall z-scores may be determined in a manner similar to that described in block 20 of FIG. 1. From block 20, the revision process advances to block 22, where an overall style characteristic is determined for each security designated as new or changed. The overall style characteristics may be determined in a manner similar to that described in block 22 of FIG. 1. From block 22, the process advances to block 24, where a value inclusion factor and a growth inclusion factor are determined for each security designated as new or changed. The value inclusion factors and the growth inclusion factors may be determined in a manner similar to that described in block 24 of FIG. 1.

From block 24, the revision process advances to block 26a, where each security designated as new or changed is allocated to the value index and/or the growth index based on the value inclusion factor and the growth inclusion factor of the security. According to various embodiments, the securities designated as new or changed can be allocated to the value index and/or the growth index in any order, without considering buffer rules, and without considering whether the allocation results in one of the indices exceeding a predetermined target percentage of the free float-adjusted market capitalization of all the securities.

Figure 6:
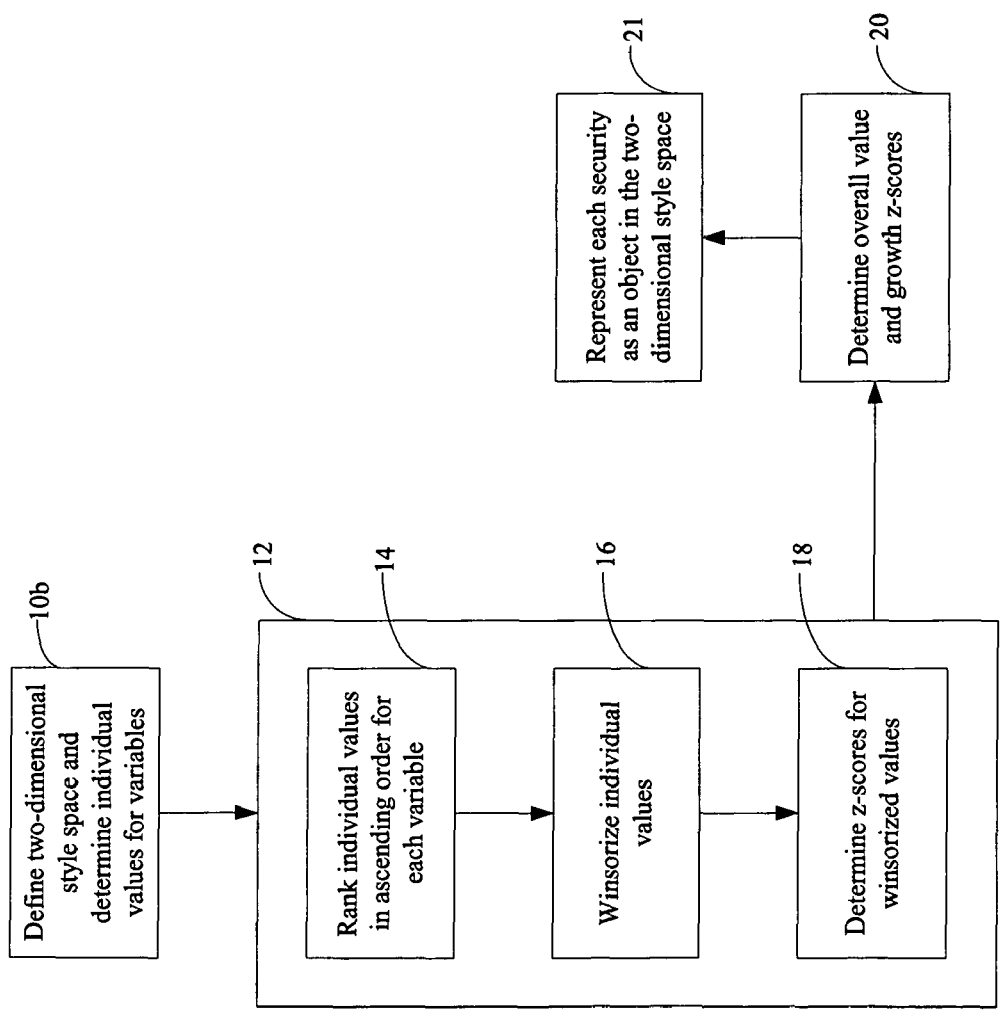
FIG. 6 illustrates a process of graphically representing a group of securities according to various embodiments.

FIG. 6 illustrates a process of graphically representing a group of securities according to various embodiments. A similar process may be employed to graphically represent a particular security. The group of securities may define a value index and an associated growth index. In addition, the securities may also define a portfolio or an underlying index such as, for example, a country index, a regional index, a market segment index, etc. The graphical representation of the securities may be used to assist an entity in the monitoring and analysis of the securities.

The process starts at block 10b, where a two-dimensional value and growth style space is defined. The two-dimensional style space may be similar to the two-dimensional value and growth style space of FIG. 2, where the first coordinate axis is designated as a growth/nongrowth axis and the second coordinate axis is designated as a value/nonvalue axis.

Once the two-dimensional value and growth style space is defined, the individual values of variables used to specify value characteristics and growth characteristics of securities are determined for each security in the group of securities. The variables may be the same variables as described hereinabove with respect to FIG. 1, and the individual values may be determined in a manner similar to that described in block 10 of FIG. 1.

From block 10b, the process advances to block 12, where a z-score of each variable is determined for each security. The z-scores may be determined in a manner similar to that described in blocks 12-18 of FIG. 1. From block 12, the process advances to block 20, where an overall value z-score and an overall growth z-score is determined for each security. The overall z-scores may be determined in a manner similar to that described in block 20 of FIG. 1.

Figure 7:
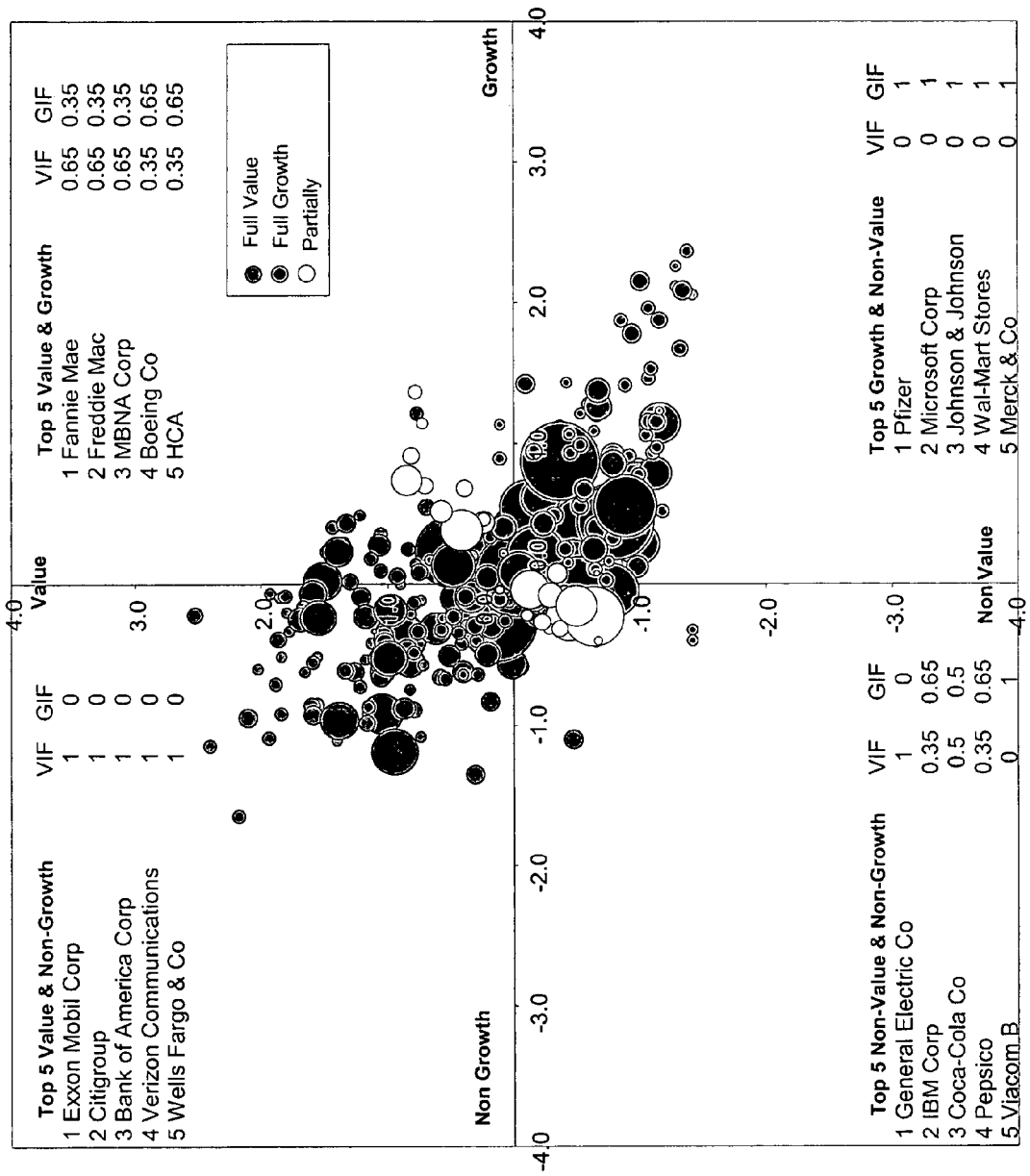
FIG. 7 is graphical representation of a group of securities according to various embodiments.

From block 20, the process advances to block 21, where each security is represented as an object in the two dimensional value and growth style space as shown in FIG. 7. For each security, the center of the object is defined by the overall value z-score and the overall growth z-score of the security, where the overall growth z-score of the security defines the horizontal coordinate of the center of the object and the overall value z-score of the security defines the vertical coordinate of the center of the object. Also, for each security, the size of the object may be representative of the free float-adjusted market capitalization of the security relative to the free float-adjusted market capitalization of all the securities. Furthermore, for each security, the color of the object may signify a particular allocation of the security. For example, according to various embodiments, a dark gray color may indicate that the security is fully allocated to a value index, a light gray color may indicate that the security is fully allocated to a growth index, and a white color may indicate that the security is partially allocated to the value index and partly allocated to the growth index.

Figure 8:
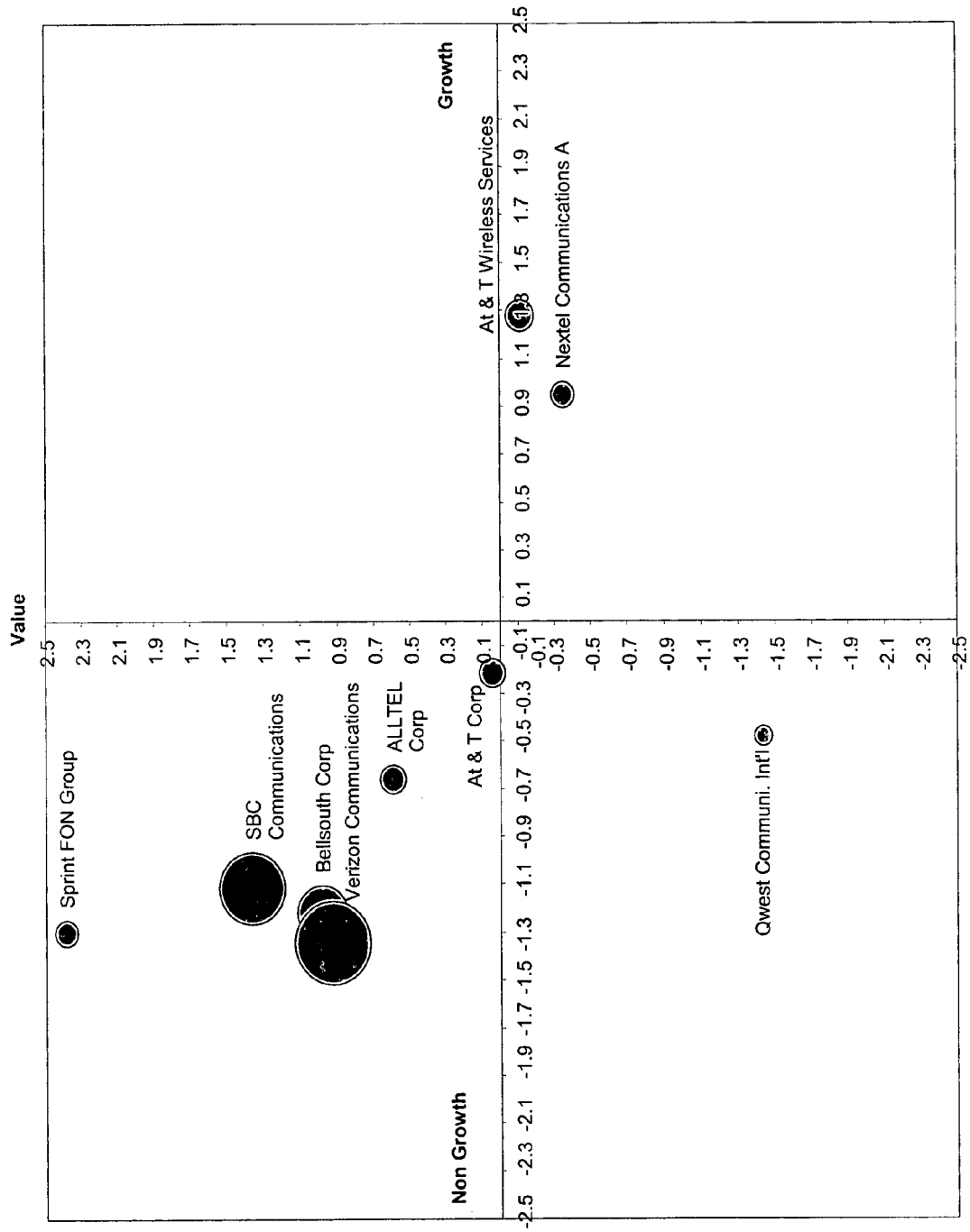
FIG. 8 is a graphical representation of a group of securities according to various embodiments.

According to various embodiments, the process described in blocks 10b-21 may also be employed to graphically represent a group of securities that define a subset of an index or a portfolio. For example, the process described in blocks 10b-21 may be employed to produce the graphical representation of securities that define a telecommunications services sector as shown in FIG. 8. Although the securities are represented as circles in FIGS. 7 and 8, it is understood that, according to various embodiments, each security may be represented as a shape other than a circle. For example, the securities may be represented as squares with two sides parallel to the first coordinate axis and two sides parallel to the second coordinate axis, or as squares having a diagonal parallel to the first coordinate axis and perpendicular to the second coordinate axis.

Figure 9:
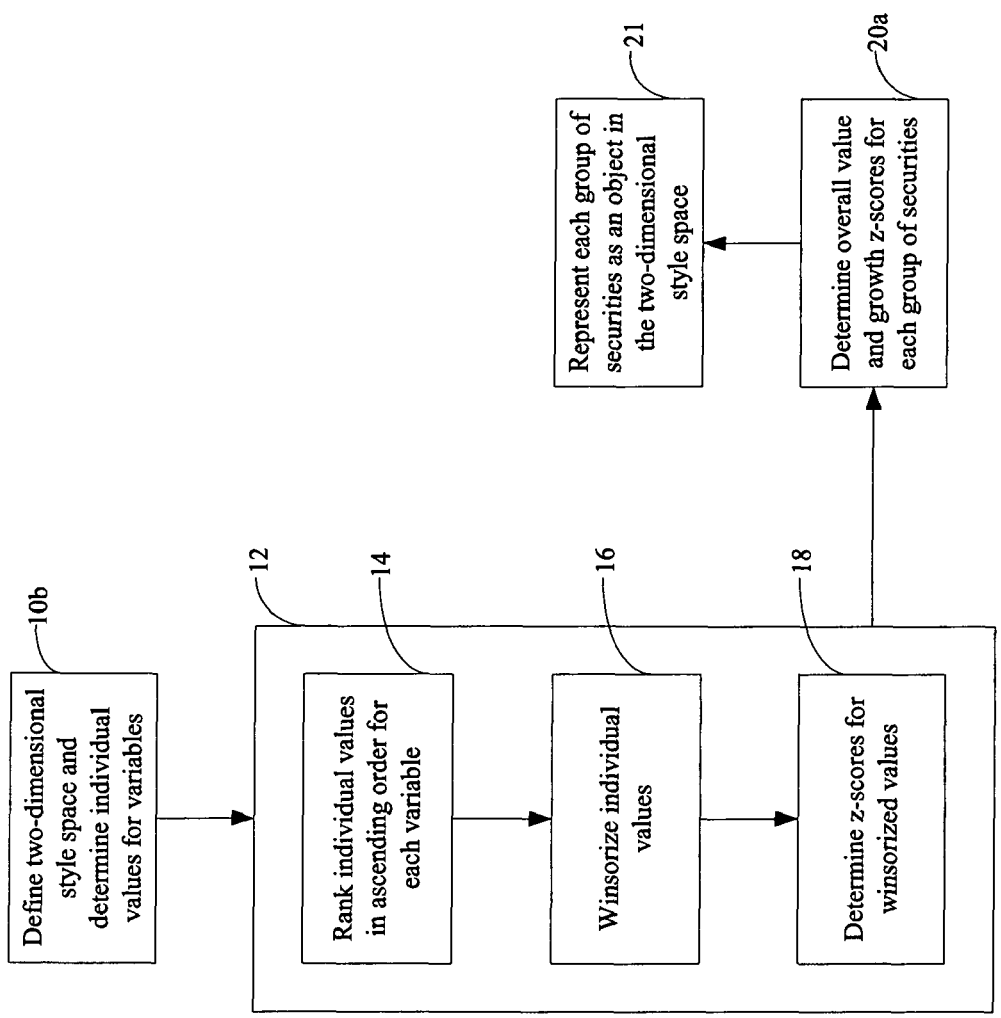
FIG. 9 illustrates a process of graphically representing a style bias of different groups of securities according to various embodiments.

FIG. 9 illustrates a process for graphically representing the style bias of different groups of securities according to various embodiments. A similar process may be employed to graphically represent the style bias of a particular group of securities. Each group of securities may define, for example, a value index and an associated growth index, an underlying index, a sector of the underlying index, a portfolio, etc. The process starts at block 10b, where a two-dimensional value and growth style space is defined. The two-dimensional style space may be similar to the two-dimensional value and growth style space of FIG. 2, where the first coordinate axis is designated as a growth/nongrowth axis and the second coordinate axis is designated as a value/nonvalue axis.

Once the two-dimensional value and growth style space is defined, the individual values of variables used to specify value characteristics and growth characteristics of each security are determined for each security in the different groups of securities. The variables may be the same variables as described hereinabove with respect to FIG. 1, and the individual values may be determined in a manner similar to that described in block 10 of FIG. 1. From block 10b, the process advances to block 12, where a z-score of each variable is determined for each security in the different groups of securities. The z-scores may be determined in a manner similar to that described in blocks 12-18 of FIG. 1.

From block 12, the process advances to block 20a, where an overall value z-score and an overall growth z-score is determined for each group of securities. To determine the overall z-scores for each group of securities, the overall value z-score and the overall growth z-score is determined for each security. The overall z-scores for each security may be determined in a manner similar to that described in block 20 of FIG. 1. Once the overall z-scores are determined for each security, the overall value z-score for each group of securities is determined by determining the weighted average of the overall value z-scores of each security in the particular group, and the overall growth z-score for each group of securities is determined by determining the weighted average of the overall growth z-scores of each security in the particular group. According to various embodiments, the weighted average for a group of securities that define an index may be determined using the index market capitalization of each security in the group, and the weighted average for a group of securities that define a portfolio may be determined using the weight of each holding in the portfolio.

Figure 10:
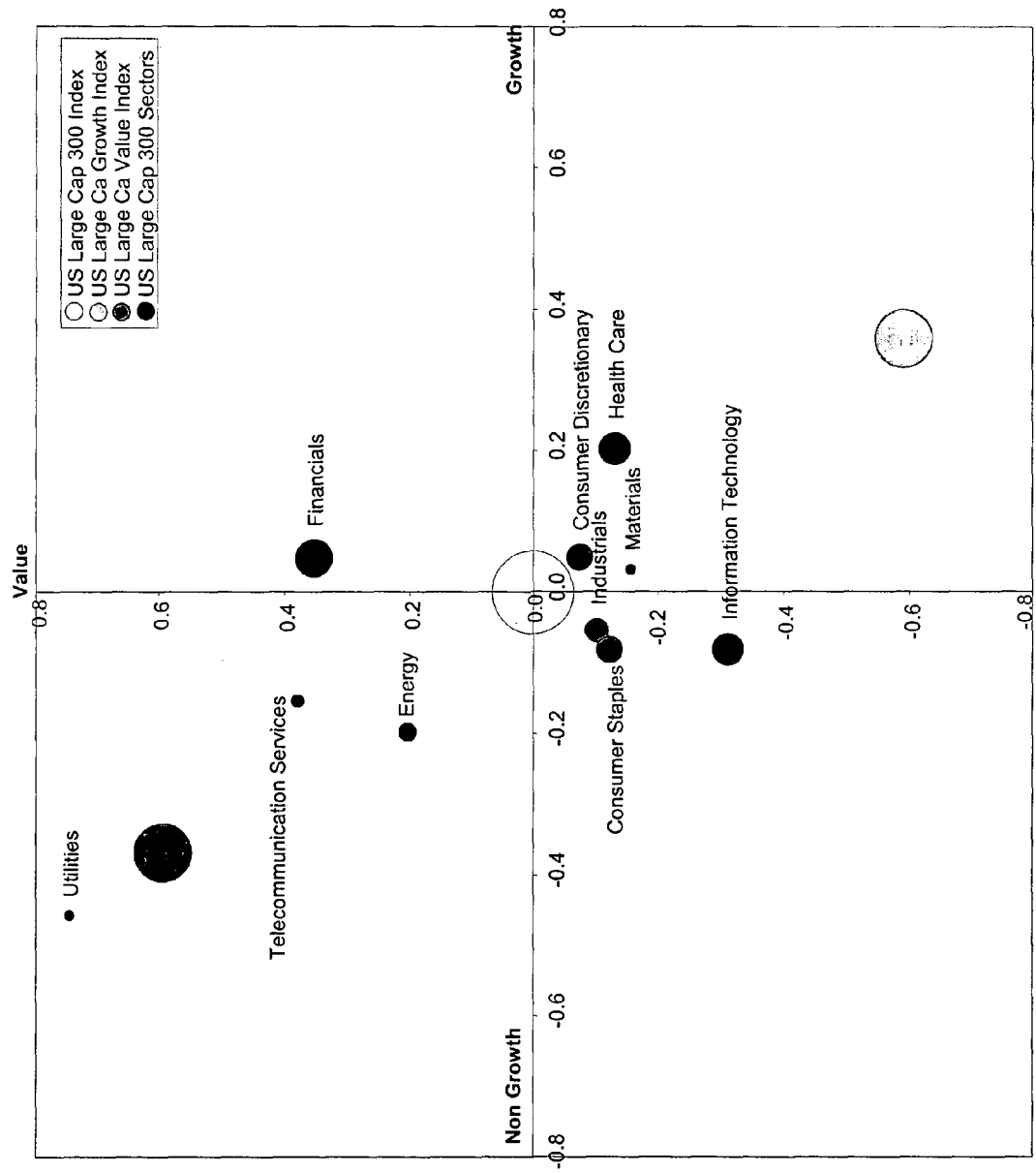
FIG. 10 is a graphical representation of different groups of securities according to various embodiments.
Figure 11:
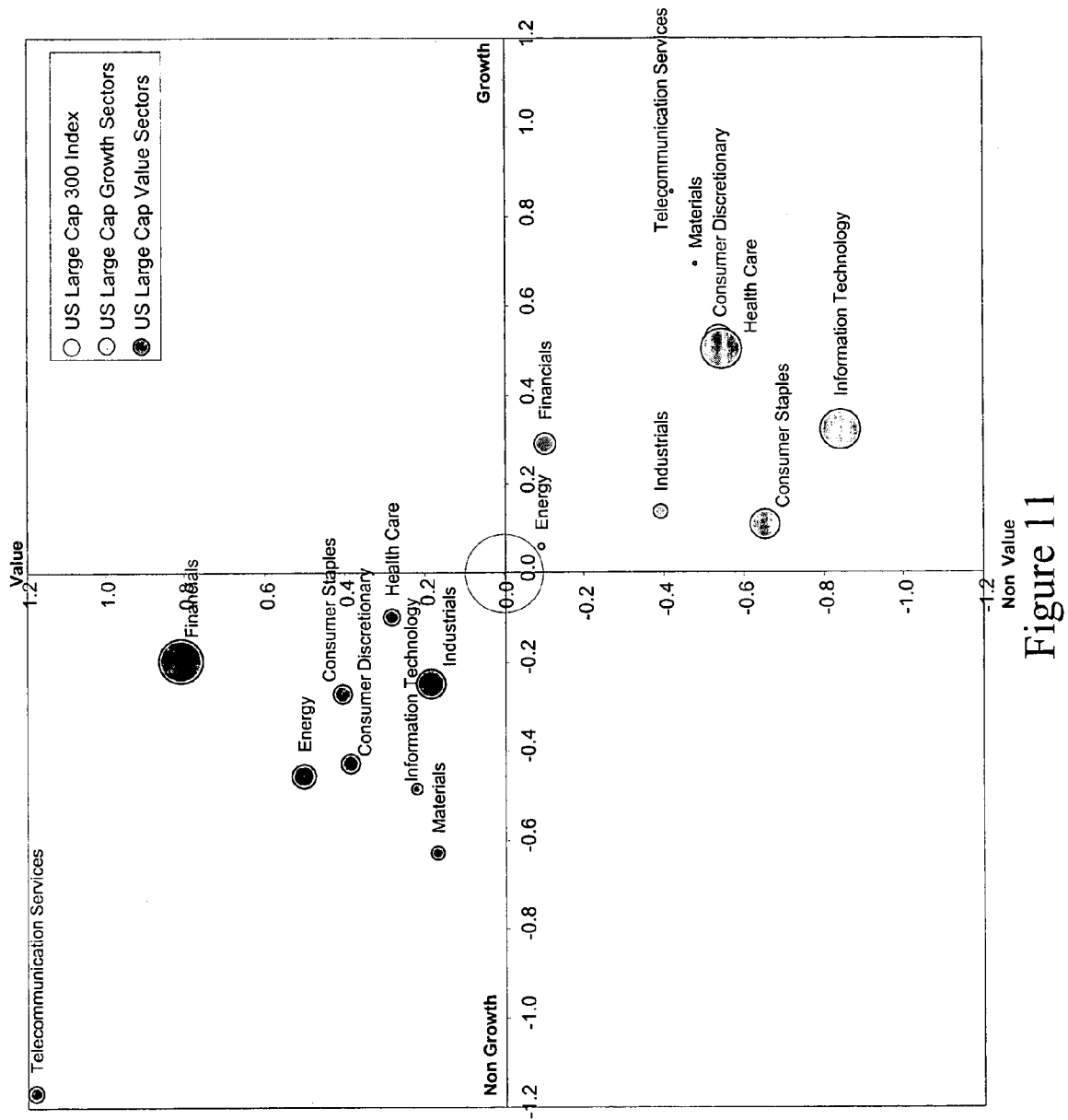
FIG. 11 is a graphical representation of different groups of securities according to various embodiments.

From block 20a, the process advances to block 21, where each group of securities is represented as an object in the two-dimensional value and growth style space as shown in FIGS. 10 and 11. For each group of securities, the center of the object is defined by the overall value z-score and the overall growth z-score of the group of securities, where the overall growth z-score of the group of securities defines the horizontal coordinate of the center of the object and the overall value z-score of the group of securities defines the vertical coordinate of the center of the object. Also, for each group of securities, the size of the object may be representative of the free float-adjusted market capitalization of the group of securities relative to the free float-adjusted market capitalization of all the securities. Furthermore, for each group of securities, the color of the object associated therewith may identify the index, sector, portfolio, etc. defined by the group of securities.

Figure 12:
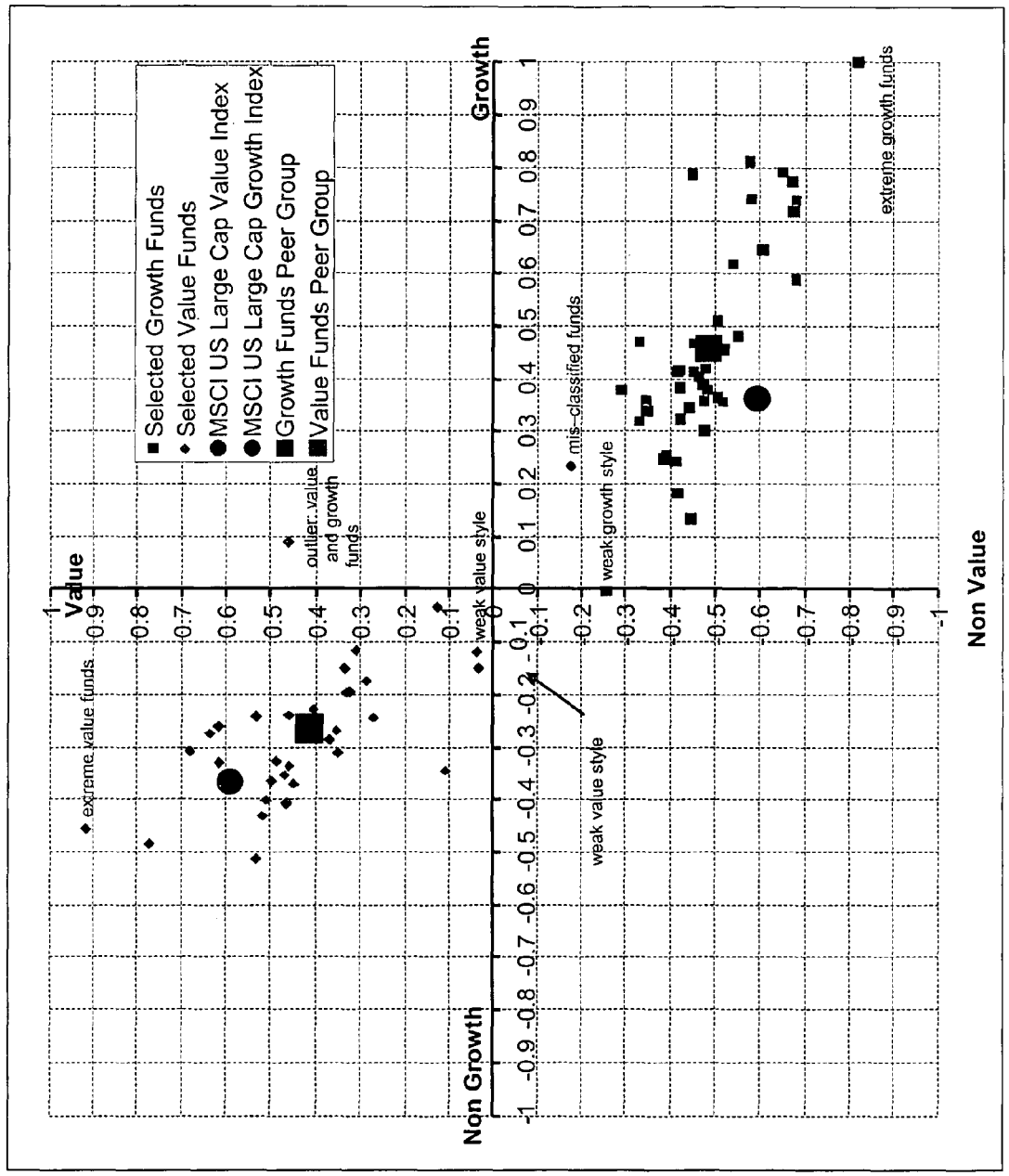
FIG. 12 is a graphical representation of different groups of securities according to various embodiments.

Although the different groups of securities are represented as circles in FIGS. 10 and 11, it is understood that, according to various embodiments, each of the different groups of securities may be represented as a shape other than a circle. For example, the different groups of securities may be represented as squares with two sides parallel to the first coordinate axis and two sides parallel to the second coordinate axis as shown in FIG. 12, as squares having a diagonal parallel to the first coordinate axis and perpendicular to the second coordinate axis as shown in FIG. 12, or any combination thereof.

Figure 13:
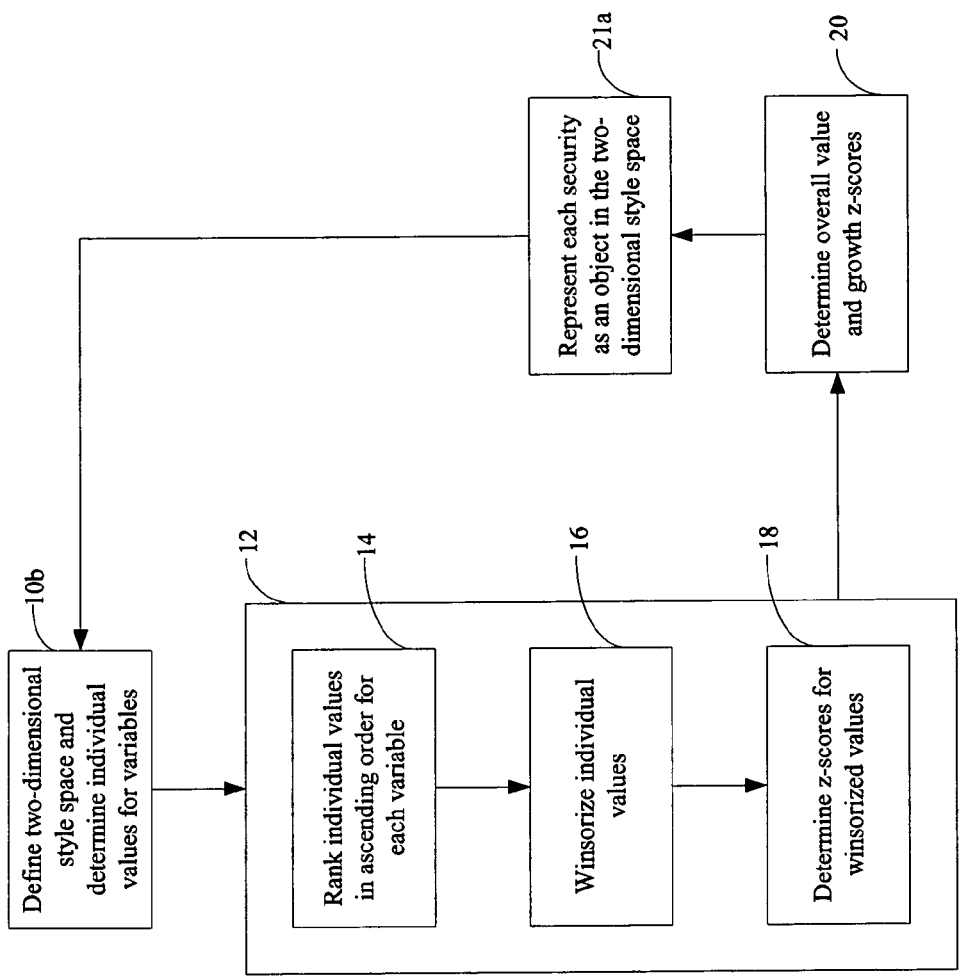
FIG. 13 illustrates a process of graphically representing the style bias drift of a security according to various embodiments.

FIG. 13 illustrates a process of graphically representing the style bias drift of a security according to various embodiments. The process may be used to monitor changes in the style bias of a security over a period of time. According to various embodiments, the period of time may be a day, a week, a month, a year, or any combination or multiple thereof. A similar process may be employed to graphically represent the style bias drift of a group of securities, and the group of securities may define an index, a sector of an index, a portfolio, etc.

The process begins at block 10b where a two-dimensional value and growth style space is defined. The two-dimensional style space may be similar to the two-dimensional value and growth style space of FIG. 2, where the first coordinate axis is designated as a growth/nongrowth axis and the second coordinate axis is designated as a value/nonvalue axis.

Once the two-dimensional value and growth style space is defined, the individual values of variables used to specify value characteristics and growth characteristics of the security are determined at a given point in time. The variables may be the same variables as described hereinabove with respect to FIG. 1, and the individual values may be determined in a manner similar to that described in block 10 of FIG. 1. From block 10, the process advances to block 12, where a z-score of each variable is determined for the security. The z-scores may be determined in a manner similar to that described in blocks 12-18 of FIG. 1. From block 12, the process advances to block 20, where an overall value z-score and an overall growth z-score is determined for the security. The overall z-scores may be determined in a manner similar to that described in block 20 of FIG. 1.

From block 20, the process advances to block 21a, where the security is represented as an object positioned in the two-dimensional value and growth style space. The center of the object is defined by the overall value z-score and the overall growth z-score of the security, where the overall growth z-score of the security defines the horizontal coordinate of the center of the object and the overall value z-score of the security defines the vertical coordinate of the center of the object. According to various embodiments, the object may be a circle, a square with two sides parallel to the first coordinate axis and two side parallel to the second coordinate axis, a square having a diagonal parallel to the first coordinate axis and perpendicular to the second coordinate axis, etc.

Figure 14:
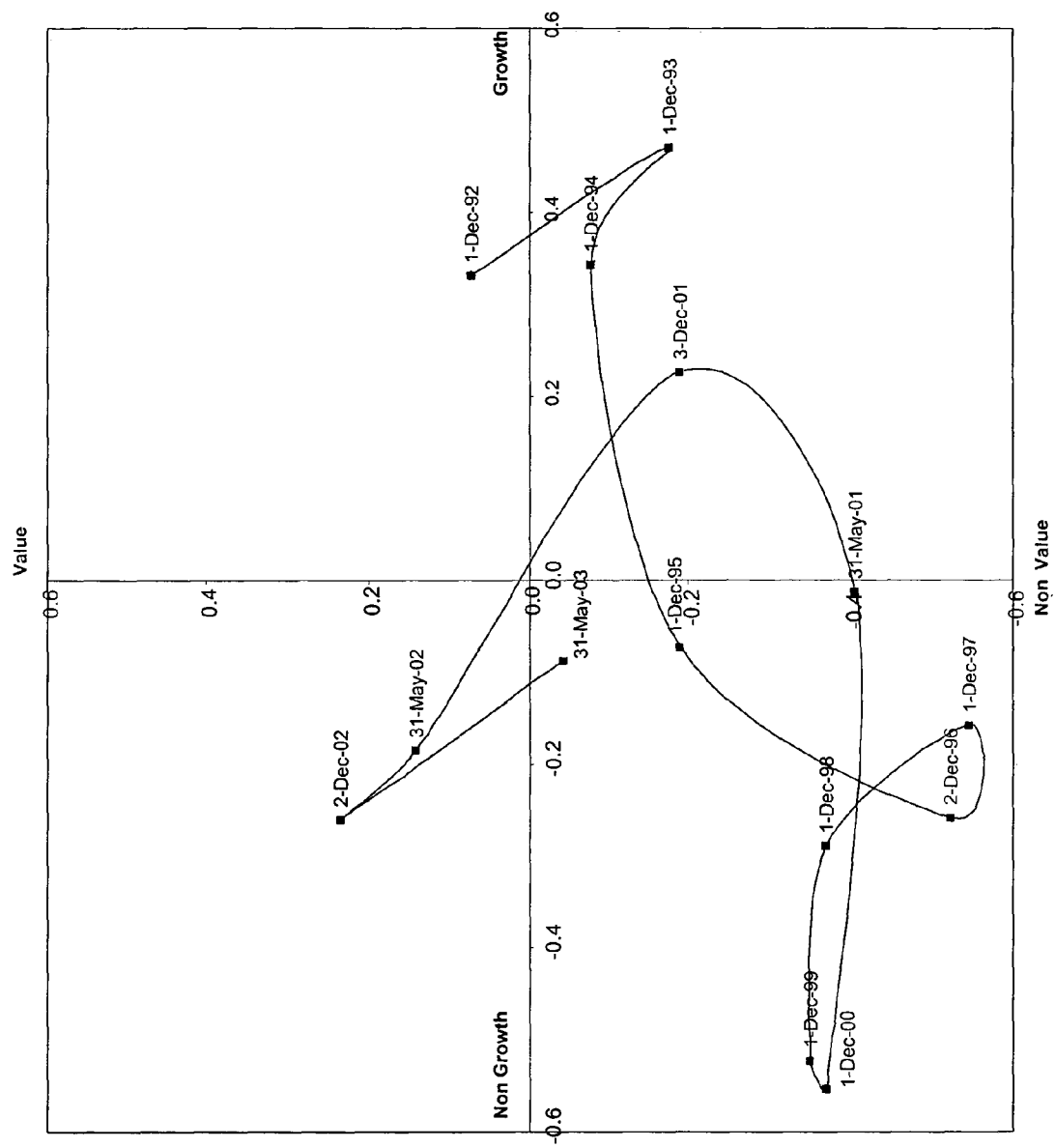
FIG. 14 is a graphical representation of the style bias drift of a security over a period of time.
Figure 15:
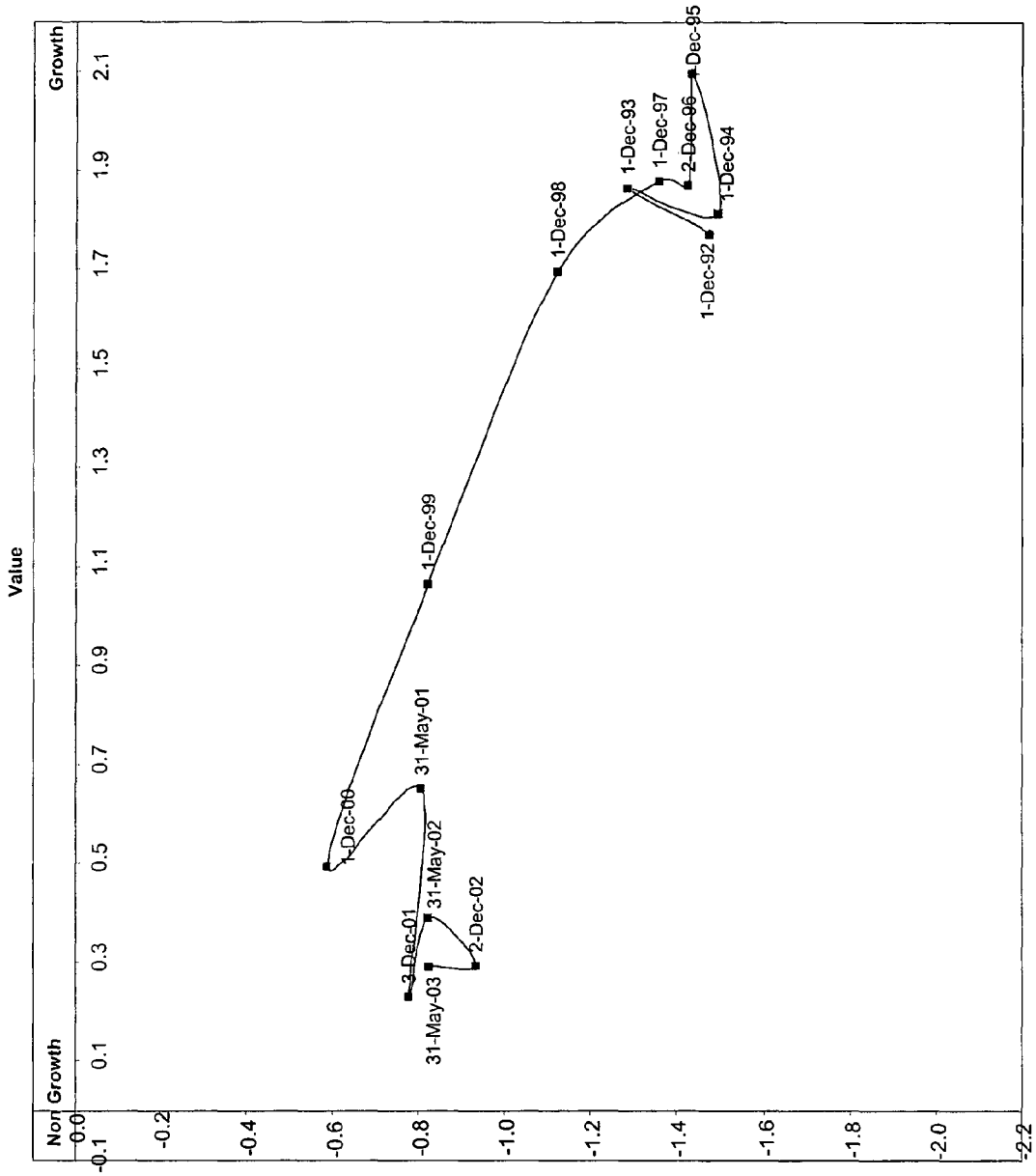
FIG. 15 is a graphical representation the style bias drift of a security over a period of time.

From block 21a, the process returns to block 10b, where the process described in blocks 10b-21a is repeated for the security. According to various embodiments, the process described in blocks 10b-21a may be repeated at any time and may be repeated any number of times. According to various embodiments, the process described in blocks 10b-21a may be repeated on a periodic basis such as, for example, a daily basis, a weekly basis, a monthly basis, a quarterly basis, a semi-annual basis, a yearly basis, etc. As a new representation of the security is positioned in the two-dimensional value and growth style space, a line may be drawn from the most recent previous position of the object to the new position of the object. Two examples of the results of the process described in blocks 10b-21a are shown in FIGS. 14 and 15.

Figure 16:
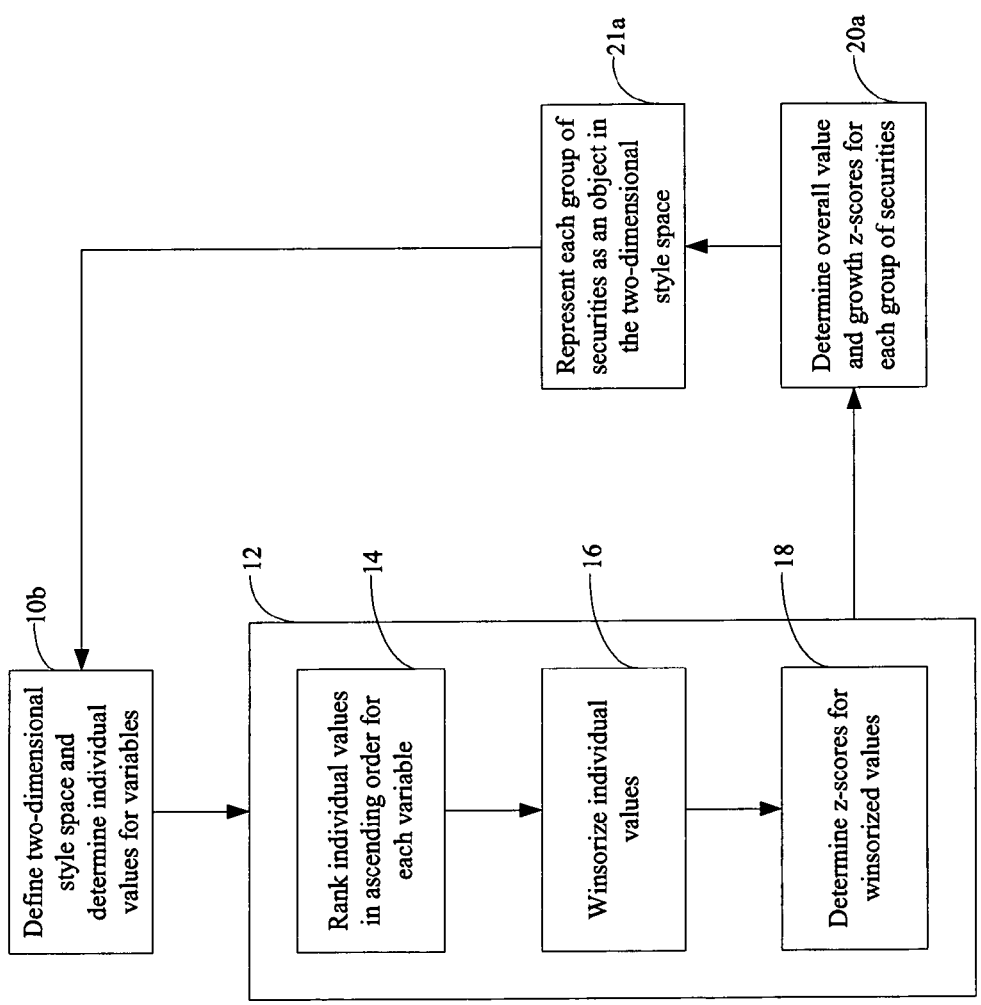
FIG. 16 illustrates a process of graphically representing the style bias drift of different groups of securities according to various embodiments.

FIG. 16 illustrates a process of graphically representing the style bias drift of different groups of securities according to various embodiments. Each group of securities may define, for example, a value index and an associated growth index, an underlying index, a sector of the underlying index, a portfolio, etc. The process may be used to monitor changes in the style bias of the different groups over a period of time. According to various embodiments, the period of time may be a day, a week, a month, a year, or any combination or multiple thereof. A similar process may be employed to graphically represent the style bias drift of a particular group of securities.

The process begins at block 10b where a two-dimensional value and growth style space is defined. The two-dimensional style space may be similar to the two-dimensional value and growth style space of FIG. 2, where the first coordinate axis is designated as a growth/non-growth axis and the second coordinate axis is designated as a value/non-value axis.

Once the two-dimensional value and growth style space is defined, the individual values of variables used to specify value characteristics and growth characteristics of each security are determined at a given point in time. The variables may be the same variables as described hereinabove with respect to FIG. 1, and the individual values may be determined in a manner similar to that described in block 10 of FIG. 1. From block 10b, the process advances to block 12, where a z-score of each variable is determined for each security. The z-scores may be determined in a manner similar to that described in blocks 12-18 of FIG. 1.

From block 12, the process advances to block 20a, where an overall value z-score and an overall growth z-score is determined for each group of securities. To determine the overall z-scores for each group of securities, the overall value z-score and the overall growth z-score is determined for each security. The overall z-scores for each security may be determined in a manner similar to that described in block 20 of FIG. 1. Once the overall z-scores are determined for each security, the overall value z-score for each group of securities is determined by determining the weighted average of the overall value z-scores of each security in the particular group, and the overall growth z-score for each group of securities is determined by determining the weighted average of the overall growth z-scores of each security in the particular group. According to various embodiments, the weighted average for a group of securities that define an index may be determined using the index market capitalization of each security in the group, and the weighted average for a group of securities that define a portfolio may be determined using the weight of each holding in the portfolio.

From block 20a, the process advances to block 21a, where each group of securities is represented as an object positioned in the two-dimensional value and growth style space. For a given group of securities, the center of the object is defined by the overall value z-score and the overall growth z-score of the group of securities, where the overall growth z-score of the group of securities defines the horizontal coordinate of the center of the object and the overall value z-score of the group of securities defines the vertical coordinate of the center of the object. According to various embodiments, the object may be a circle, a square with two sides parallel to the first coordinate axis and two side parallel to the second coordinate axis, a square having a diagonal parallel to the first coordinate axis and perpendicular to the second coordinate axis, etc, and each group of securities may be represented by a different object.

Figure 17A:
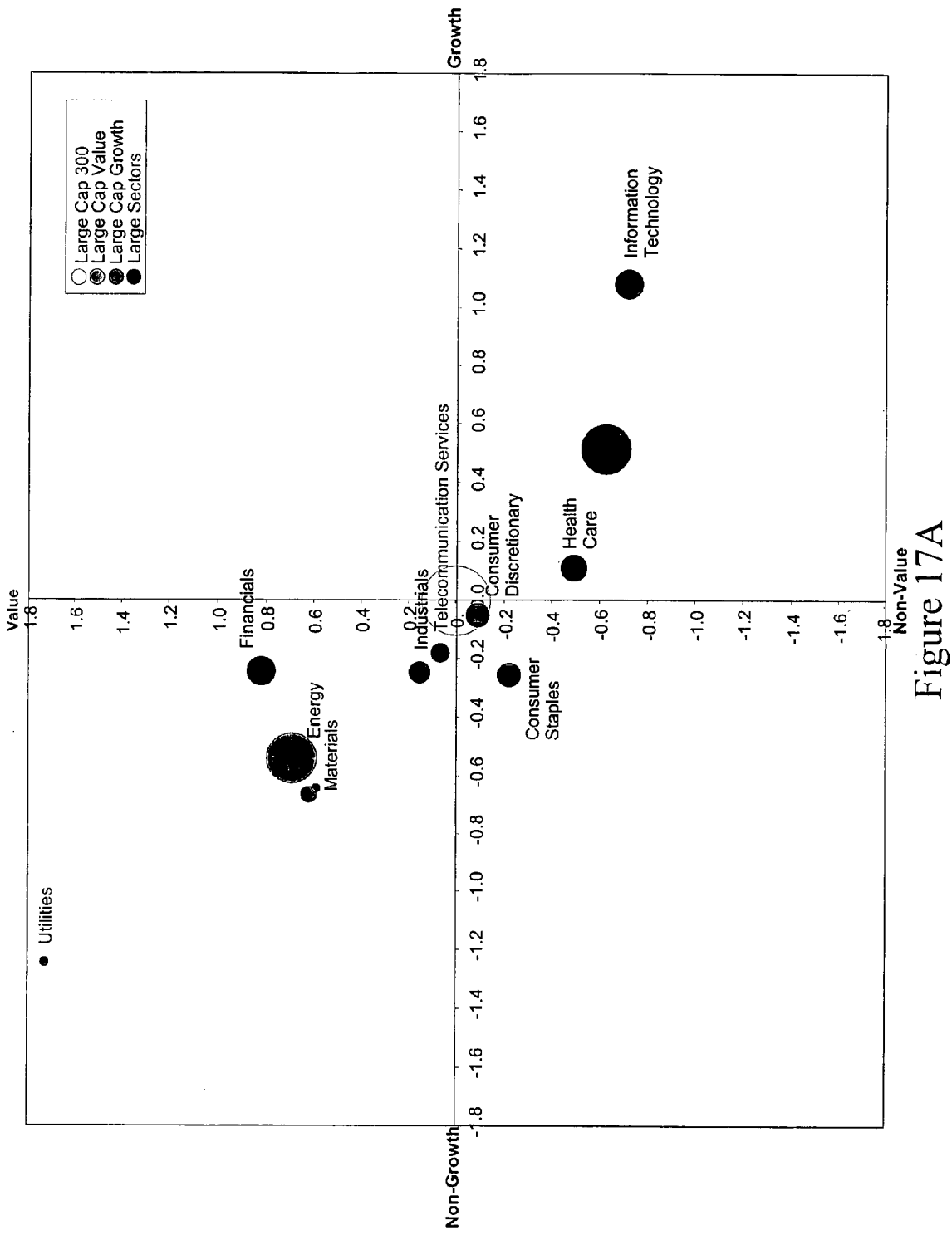
FIGS. 17A and 17B are graphical representations of the style bias drift of different groups of securities at two different points in time.
Figure 17B:
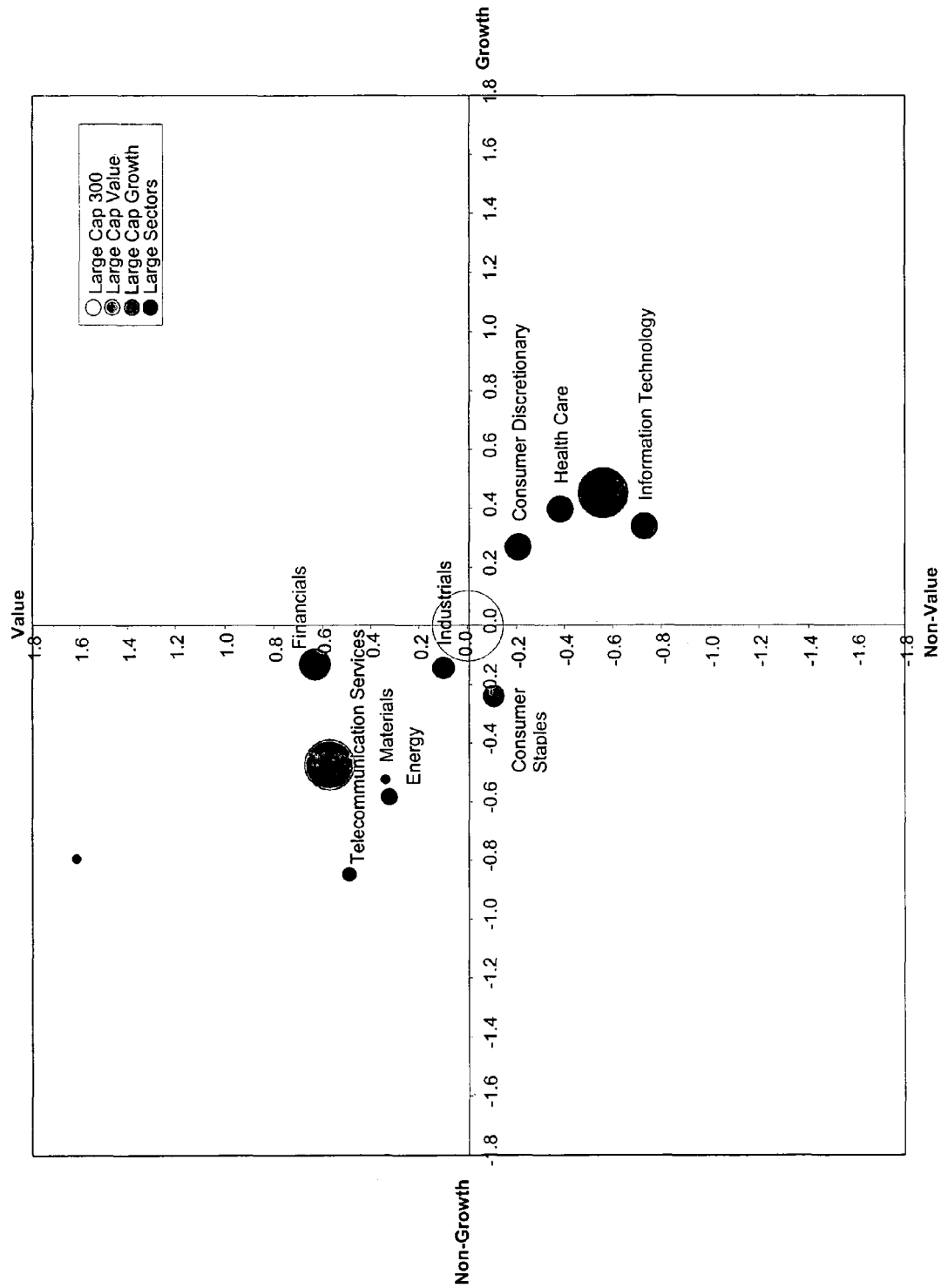

From block 21a, the process returns to block 10b, where the process described in blocks 10b-21a is repeated for the different groups of securities. According to various embodiments, the process described in blocks 10b-21a may be repeated at any time and may be repeated any number of times. According to various embodiments, the process described in blocks 10b-21a may be repeated on a periodic basis such as, for example, a daily basis, a weekly basis, a monthly, a semi-annual basis, a yearly basis, etc. As a new representation of a particular group of securities is positioned in the two-dimensional value and growth style space, a line may be drawn from the most recent previous position of the object representative of the particular group to the new position of the object representative of the particular group in a manner similar to that described in block 21a of FIG. 13. According to other embodiments, each time the process described in blocks 10b-21a is repeated, the new representations of each group of securities may be positioned in a new two-dimensional value and growth style space. An example of this is shown in FIGS. 17A and 17B, where FIG. 17A shows the style bias of the different groups of securities at one point in time and FIG. 17B shows the style bias of the different groups of securities at a subsequent point in time. According to such embodiments, a comparison of the respective two-dimensional value and growth style spaces reveals the style bias drift of the different groups of securities.

Figure 18:
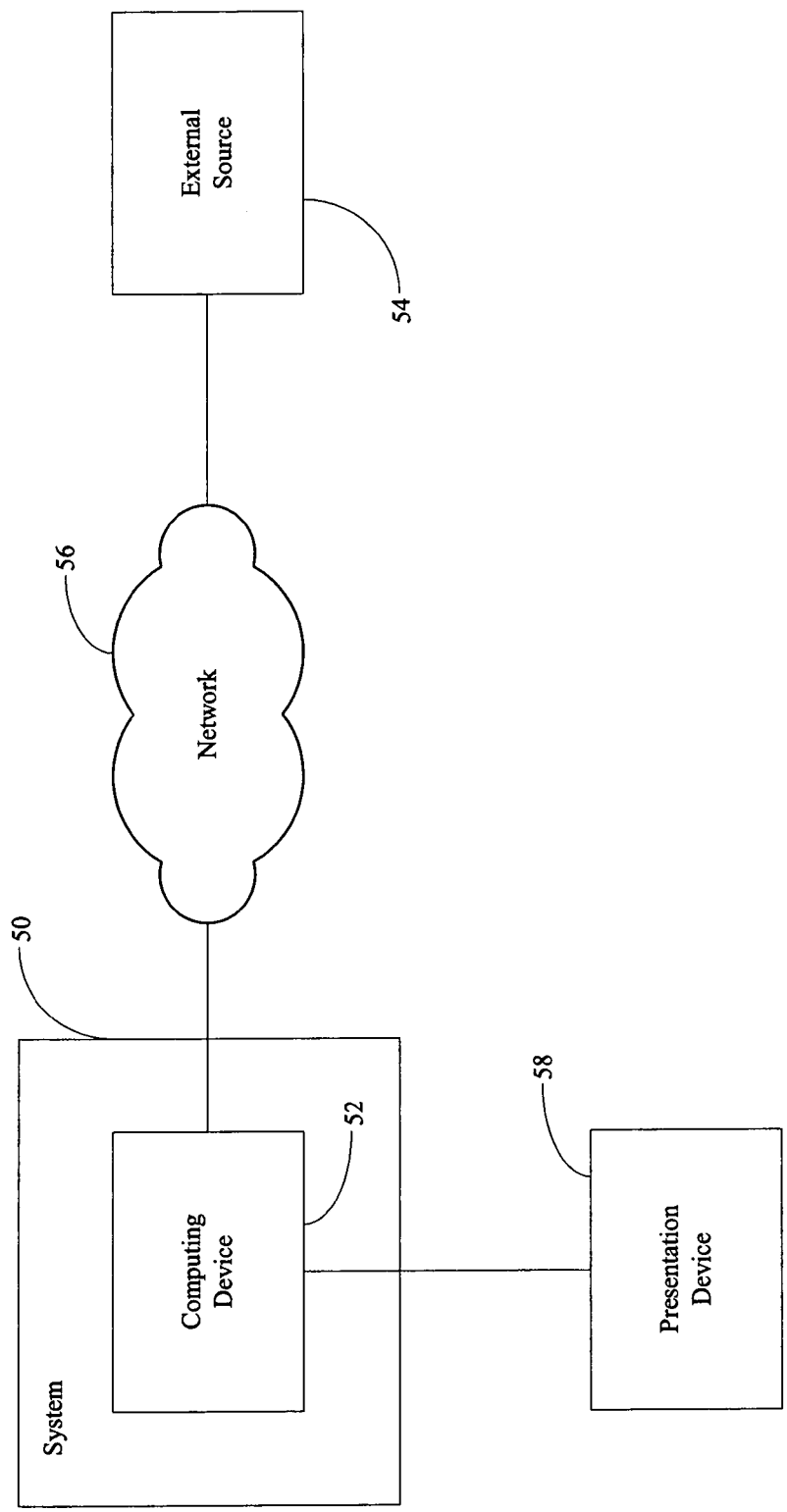
FIG. 18 illustrates various embodiments of a system for constructing a value index and a growth index.

FIG. 18 illustrates various embodiments of a system 50 for constructing a value index and a growth index. The system 50 may include a computing device 52 for receiving data associated with the securities that define the value index and the growth index. The data may be received from an external source 54 via a network 56 such as, for example, a local area network, a metropolitan area network, a wide area network, or the internet.

According to various embodiments, the computing device 52 may further be for determining a value of each variable in a group of variables for each security in a group of securities, determining a z-score for each variable for each security, and determining an overall value z-score and an overall growth z-score for each security. The computing device 52 may further be for determining an overall style characteristic for each security, determining a value inclusion factor and a growth inclusion factor for each security, and allocating each security to at least one of the value index and the growth index.

According to various embodiments, the system 50 may further be for reallocating securities associated with a value index and a growth index, for revising a value index and a growth index, for graphically representing a group of securities in a two-dimensional value and style growth space, for graphically representing the style bias of different groups of securities, for graphically representing the style bias drift of a security over a period of time, and for graphically representing the style bias drift of different groups of securities at different points in time.

For such embodiments, the computing device 52 is further for applying a buffer rule to the value inclusion factor and the growth inclusion factor for each security, for allocating securities designated as new or changed to the value index and/or the growth index, for defining the two-dimensional value and growth style space and for representing each security as an object in the two-dimensional space, for determining an overall value z-score and an overall growth z-score for each group of securities, and for connecting the most recent previous position of an object in the two-dimensional value and growth style space to the new position of the object in the two-dimensional value and growth style space.

The computing device 52 may further be for transmitting the graphical representation to a presentation device 58 in communication with the computing device 52. The presentation device 58 may be embodied as, for example, a printer or a display monitor.

Although the computing device 52 is shown as a single unit in FIG. 18 for purposes of convenience, it should be recognized that the computing device 52 may comprise a number of distributed computing devices, inside and/or outside the administrative domain.

In order to perform the processes described hereinabove, the computing device 52 may execute a series of instructions. The instructions may be software code to be executed by the computing device 52. The software code may be stored as a series of instructions or commands on a computer readable medium such as a random access memory (RAM) and/or a read only memory (ROM), a magnetic medium such as a hard-drive or a floppy disk, or an optical medium such as a CD-ROM. The software code may be written in any suitable programming language using any suitable programming technique. For example, the software code may be written in C using procedural programming techniques, or in Java or C++ using object-oriented programming techniques.

While several embodiments of the disclosed invention have been described, it should be apparent, however, that various modifications, alterations and adaptations to those embodiments may occur to persons skilled in the art with the attainment of some or all of the advantages of the disclosed invention. For example, the two-dimensional style space may represent characteristics other than value and growth. A three-dimensional style space or a four-dimensional style space may be utilized in lieu of the two-dimensional style space. It is therefore intended to cover all such modifications, alterations and adaptations without departing from the scope and spirit of the disclosed invention as defined by the appended claims.

What is claimed is:

1. A method of constructing a value index and a growth index for a group of securities, the method comprising, with a computer device:

receiving, by the computer device over a computer network, data regarding each security in the group of securities from an external data source;

determining, with the computer device, a value of each variable in a group of variables for each security in the group of securities, wherein determining the value of each variable includes (i) determining a value of each value variable in the group of variables and (ii) determining a value of each growth variable in the group of variables;

determining, with the computer device, a standardized score of each value and growth variable for each security, wherein determining the standardized score of each value and growth variable includes (i) winsorizing the values for each value and growth variable and (ii) standardizing the winsorized values, wherein standardizing the winsorized values includes determining a z-score, and wherein determining the z-score includes (i) determining a winsorized per share value, (ii) determining a free float-adjusted market capitalization weighted market mean, and (iii) determining a free float-adjusted market capitalization weighted market standard deviation;

determining, with the computer device, an overall value standardized score and an overall growth standardized score for each security;

determining, with the computer device, a value inclusion factor and a growth inclusion factor for each security based on the overall value standardized score and the overall growth standardized score for each security, wherein the value inclusion factor for a security represents a proportion of the security's free-float adjusted market capitalization to be allocated to the value index and the growth inclusion factor for a security represents a proportion of the security's free-float adjusted market capitalization to be allocated to the growth index, wherein the value inclusion factor for each security is equal to or greater than zero and less than or equal to one, and the growth inclusion factor for each security is equal to or greater than zero and less than or equal to one, wherein a sum of the value inclusion factor and the growth inclusion factor for each security is equal to one; and allocating, with the computer device, a set of the securities in the group of securities to at least one of the value index and the growth index based on the overall value standardized score, the overall growth standardized score, the value inclusion factor, and the growth inclusion factor for each security, wherein, for each security in the set, a proportion of the security's free-float adjusted market capitalization that is allocated to the value index is based on the value inclusion factor for the security and a proportion of the security's free-float adjusted market capitalization that is allocated to the growth index is based on the growth inclusion factor for the security.

2. The method of claim 1, wherein determining the value of each value variable includes determining a book value to price ratio, a twelve month forward earnings to price ratio, and a dividend yield.

3. The method of claim 1, wherein determining the value of each growth variable includes determining a long-term forward earnings per share growth rate, a short-term forward earnings per share growth rate, a current internal growth rate, a long-term historical earnings per share growth trend, and a long-term historical sales per share growth trend.

4. The method of claim 1, wherein determining the value of each variable includes determining a book value to price ratio, a twelve month forward earnings to price ratio, a dividend yield, a long-term forward earnings per share growth rate, a short-term forward earnings per share growth rate, a current internal growth rate, a long-term historical earnings per share growth trend, and a long-term historical sales per share growth trend.

5. The method of claim 1, wherein determining the free float-adjusted market capitalization weighted market mean includes determining the free float-adjusted market capitalization weighted market mean from securities without missing variable values.

6. The method of claim 5, wherein determining the free float-adjusted market capitalization weighted market standard deviation includes determining the free float-adjusted market capitalization weighted market standard deviation from securities without missing variable values.

7. The method of claim 1, wherein determining the overall value standardized score for each security includes:
   designating the standardized scores of each variable as one of a value standardized score and a growth standardized score;
   determining an average of available value standardized scores for each security.

8. The method of claim 7, wherein determining the overall growth standardized score for each security includes determining an average of the growth standardized scores for each security.

9. The method of claim 8, wherein determining an average of the growth standardized scores includes determining a weighted average.

10. The method of claim 1, wherein allocating each security to at least one of the value index and the growth index includes:
    determining a distance of the coordinate for each the security to the origin of the two-dimensional style space for each security;
    ranking the securities by distance from the origin;
    allocating the securities in descending order of the distance of the coordinate for each security from the origin to at least one of the value index and the growth index until a cumulative weight of one of the value index and the growth index is greater than a predetermined target percentage of a free float-adjusted market capitalization of all the securities;
    determining a final allocation for a middle security;
    when the final allocation of the middle security does not result in the cumulative weight of one of the value index and the growth index exceeding the predetermined target percentage of the free float-adjusted market capitalization of all the securities, allocating remaining securities in descending order of the distance of the coordinate for each security from the origin to at least one of the value index and the growth index until the cumulative weight of one of the value index and the growth index exceeds the predetermined target percentage of the free float-adjusted market capitalization of all the securities; and
    when the final allocation of the middle security results in the cumulative weight of one of the value index and the growth index exceeding the predetermined target percentage of the free float-adjusted market capitalization of all the securities, allocating unallocated securities to the one of the value index and the growth index that has not exceeded the predetermined target percentage of the free float-adjusted market capitalization of all the securities.

11. The method of claim 10, wherein allocating the securities in descending order of distance from the origin to one of the value index and growth index until the cumulative weight of one of the value index and the growth index exceeds the predetermined target percentage of the free float-adjusted market capitalization of all the securities includes partially allocating to the value index and partially allocating to the growth index when the value inclusion factor is greater than zero but less than one.

12. The method of claim 10, wherein determining the final allocation for the middle security includes determining whether the free float-adjusted market capitalization weight of the middle security is less than, equal to or greater than a predetermined portion of the free float-adjusted market capitalization of all the securities.

13. The method of claim 12, wherein determining the final allocation for the middle security includes:
    (a) determining the cumulative free float-adjusted market capitalization weight of the value index when the middle security is fully allocated thereto;
    (b) determining the cumulative free float-adjusted market capitalization weight of the growth index when the middle security is fully allocated thereto; and
    (c) fully allocating the middle security to the value index when:
        the free float-adjusted market capitalization weight of the middle security is less than or equal to the predetermined portion of the free float-adjusted market capitalization of all the securities; and
        the predetermined target percentage of the free-float adjusted market capitalization of all the securities is closer to a value determined at step (a) than to a value determined at step (b).

14. The method of claim 12, wherein determining the final allocation for the middle security includes:
    (a) determining the cumulative free float-adjusted market capitalization weight of the value index when the middle security is fully allocated thereto;
    (b) determining the cumulative free float-adjusted market capitalization weight of the growth index when the middle security is fully allocated thereto; and
    (c) fully allocating the middle security to the growth index when:
        the free float-adjusted market capitalization weight of the middle security is less than or equal to the predetermined portion of the free float-adjusted market capitalization of all the securities; and
        the predetermined target percentage of the free-float adjusted market capitalization of all the securities is closer to a value determined at step (b) than to a value determined at step (a).

15. The method of claim 12, wherein determining the final allocation for the middle security includes:
    (a) determining the cumulative free float-adjusted market capitalization weight of the value index when the middle security is fully allocated thereto;
    (b) determining the cumulative free float-adjusted market capitalization weight of the value index when the middle security is partially allocated thereto;
    (c) determining the cumulative free float-adjusted market capitalization weight of the growth index when the middle security is fully allocated thereto;
    (d) determining the cumulative free float-adjusted market capitalization weight of the growth index when the middle security is partially allocated thereto; and
    (e) fully allocating the middle security to the value index when:

the free float-adjusted market capitalization weight of the middle security is greater than the predetermined portion of the free float-adjusted market capitalization of all the securities; and the predetermined target percentage of the free-float adjusted market capitalization of all the securities is closer to a value determined at step (a) than to values determined at steps (b), (c) and (d).

16. The method of claim 12, wherein determining the final allocation for the middle security includes:
   (a) determining the cumulative free float-adjusted market capitalization weight of the value index when the middle security is fully allocated thereto;
   (b) determining the cumulative free float-adjusted market capitalization weight of the value index when the middle security is partially allocated thereto;
   (c) determining the cumulative free float-adjusted market capitalization weight of the growth index when the middle security is fully allocated thereto;
   (d) determining the cumulative free float-adjusted market capitalization weight of the growth index when the middle security is partially allocated thereto; and
   (e) fully allocating the middle security to the growth index when:
      the free float-adjusted market capitalization weight of the middle security is greater than the predetermined portion of the free float-adjusted market capitalization of all the securities; and
      the predetermined target percentage of the free-float adjusted market capitalization of all the securities is closer to a value determined at step (c) than to values determined at steps (a), (b) and (d).

17. The method of claim 12, wherein determining the final allocation for the middle security includes:
   (a) determining the cumulative free float-adjusted market capitalization weight of the value index when the middle security is fully allocated thereto;
   (b) determining the cumulative free float-adjusted market capitalization weight of the value index when the middle security is partially allocated thereto;
   (c) determining the cumulative free float-adjusted market capitalization weight of the growth index when the middle security is fully allocated thereto;
   (d) determining the cumulative free float-adjusted market capitalization weight of the growth index when the middle security is partially allocated thereto; and
   (e) partially allocating the middle security to the value index and the growth index when:
      the free float-adjusted market capitalization weight of the middle security is greater than the predetermined portion of the free float-adjusted market capitalization of all the securities; and
      the predetermined target percentage of the free-float adjusted market capitalization of all the securities is closer to a value determined at one of steps (b) and (d) than to values determined at steps (a) and (c).

18. A method of reallocating securities associated with a value index and a growth index for a group of securities, the method comprising, with a computer device:
   receiving, by the computer device over a computer network, data regarding each security in the group of securities from an external data source;
   determining, with the computer device, a value of each variable in a group of variables for each security in the group of securities, wherein determining the value of each variable includes (i) determining a value of each value variable in the group of variables and (ii) determining a value of each growth variable in the group of variables;
   determining, with the computer device, a standardized score of each value and growth variable for each security, wherein determining the standardized score of each value and growth variable includes (i) winsorizing the values for each value and growth variable and (ii) standardizing the winsorized values, wherein standardizing the winsorized values includes determining a z-score, and wherein determining the z-score includes (i) determining a winsorized per share value, (ii) determining a free float-adjusted market capitalization weighted market mean, and (iii) determining a free float-adjusted market capitalization weighted market standard deviation;
   determining, with the computer device, an overall value standardized score and an overall growth standardized score for each security;
   determining, with the computer device, a value inclusion factor and a growth inclusion factor for each security based on the overall value standardized score and the overall growth standardized score for each security, wherein the value inclusion factor for a security represents a proportion of the security's free-float adjusted market capitalization to be allocated to the value index and the growth inclusion factor for a security represents a proportion of the security's free-float adjusted market capitalization to be allocated to the growth index, wherein the value inclusion factor for each security is equal to or greater than zero and less than or equal to one, and the growth inclusion factor for each security is equal to or greater than zero and less than or equal to one, wherein a sum of the value inclusion factor and the growth inclusion factor for each security is equal to one;
   applying, with the computer device, a buffer rule to the value inclusion factor and the growth factor for each security; and
   allocating, with the computer device, a set of the securities in the group of securities to at least one of the value index and the growth index based on the overall value standardized score, the overall growth standardized score, the value inclusion factor, and the growth inclusion factor for each security, wherein, for each security in the set, a proportion of the security's free-float adjusted market capitalization that is allocated to the value index is based on the value inclusion factor for the security and a proportion of the security's free-float adjusted market capitalization that is allocated to the growth index is based on the growth inclusion factor for the security.

19. The method of claim 18, wherein applying the buffer rule includes:
   defining a buffer area in a two-dimensional style space wherein the two-dimensional style space comprises a first coordinate axis and a second coordinate axis;
   positioning an object for each security in the two-dimensional style space; and
   resetting the value inclusion factor and the growth inclusion factor for each security coincident with the buffer area.

20. The method of claim 19, wherein defining the buffer area includes:
   defining a first rectangle longitudinally bisected by a first coordinate axis of the two-dimensional style space; and
   defining a second rectangle longitudinally bisected by a second coordinate axis of the two-dimensional style space.

21. The method of claim 19, wherein resetting the value inclusion factor and the growth inclusion factor for each security coincident with the buffer area includes setting the value inclusion factor and the growth inclusion factor equal to a previous value inclusion factor and a previous growth inclusion factor.

22. A computer readable medium, having stored thereon instructions which when executed by a computing device, cause the computing device to:
- determine a value of each variable in a group of variables for each security in a group of securities, wherein determining the value of each variable includes (i) determining a value of each value variable in the group of variables and (ii) determining a value of each growth variable in the group of variables;
- determine a standardized score of each value and growth variable for each security, wherein determining the standardized score of each value and growth variable includes (i) winsorizing the values for each value and growth variable and (ii) standardizing the winsorized values, wherein standardizing the winsorized values includes determining a z-score, and wherein determining the z-score includes (i) determining a winsorized per share value, (ii) determining a free float-adjusted market capitalization weighted market mean, and (iii) determining a free float-adjusted market capitalization weighted market standard deviation;
- determine an overall value standardized score and an overall growth standardized score for each security;
- determine a value inclusion factor and a growth inclusion factor for each security based on the overall value standardized score and the overall growth standardized score for each security, wherein the value inclusion factor for a security represents a proportion of the security's free-float adjusted market capitalization to be allocated to the value index and the growth inclusion factor for a security represents a proportion of the security's free-float adjusted market capitalization to be allocated to the growth index, wherein the value inclusion factor for each security is equal to or greater than zero and less than or equal to one, and the growth inclusion factor for each security is equal to or greater than zero and less than or equal to one, wherein a sum of the value inclusion factor and the growth inclusion factor for each security is equal to one; and
- allocate a set of the securities in the group of securities to at least one of a growth index and a value index based on the overall value standardized score, the overall growth standardized score, the value inclusion factor, and the growth inclusion factor for each security, wherein, for each security in the set, a proportion of the security's free-float adjusted market capitalization that is allocated to the value index is based on the value inclusion factor for the security and a proportion of the security's free-float adjusted market capitalization that is allocated to the growth index is based on the growth inclusion factor for the security.

23. The computer readable medium of claim 22, having further stored thereon instructions which, when executed by the computing device, cause the computing device to:
- apply a buffer rule to the value inclusion factor and the growth inclusion factor.

* * * * *